(12) United States Patent
Hata et al.

(10) Patent No.: US 6,266,158 B1
(45) Date of Patent: *Jul. 24, 2001

(54) IMAGE ENCODING/DECODING DEVICE AND METHOD

(75) Inventors: Koichi Hata, Yamatokoriyama; Minoru Etoh, Katano, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,511

(22) Filed: Jan. 21, 1998

(30) Foreign Application Priority Data

Jan. 22, 1997 (JP) .................................................... 9-009369
May 21, 1997 (JP) .................................................... 9-130614

(51) Int. Cl.$^7$ .................................................. H04N 1/411
(52) U.S. Cl. ........................................ 358/261.2; 382/233
(58) Field of Search ................................... 345/202, 427, 345/419; 358/261.2; 364/715.02; 382/232, 233, 276, 473, 949, 951, 238, 239; 348/411.1, 394.1

(56) References Cited

U.S. PATENT DOCUMENTS

| | | | | |
|---|---|---|---|---|
| 5,287,437 | * | 2/1994 | Deering | 345/427 |
| 5,872,575 | * | 2/1999 | Segal | 345/473 |
| 5,936,670 | * | 8/1999 | Frencken | 348/413 |
| 6,078,722 | * | 6/2000 | Kawamura et al. | 386/68 |

* cited by examiner

Primary Examiner—Von J. Couso
(74) Attorney, Agent, or Firm—Wenderoth, Lind & Ponack, L.L.P.

(57) ABSTRACT

The invention is characterised in that it has a reference/predictive grouping unit 105 into which a plurality of images which are to be encoded is input together with the relevant camera position data, and whereby the plurality of images which are to be encoded is grouped into reference images and predictive images which are predictively encoded from the reference images, a reference image encoding unit 106 which encodes the reference images, a predictive image encoding unit 108 which uses reconstructed reference images to encode predictive images, and a reference relationship table compilation unit 109 which compiles a reference relationship table detailing reference relationships, encoded data positions and camera positions, and outputs the reference relationship table and the encoded data.

27 Claims, 38 Drawing Sheets

Fig.2
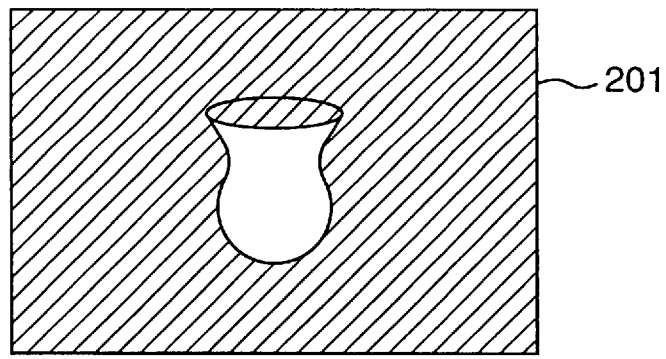
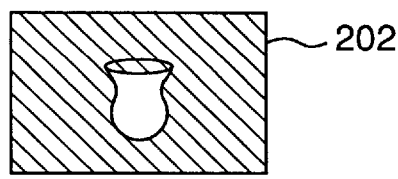
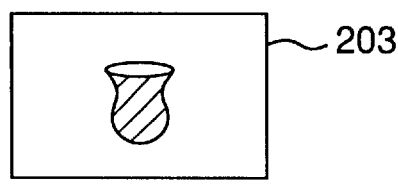
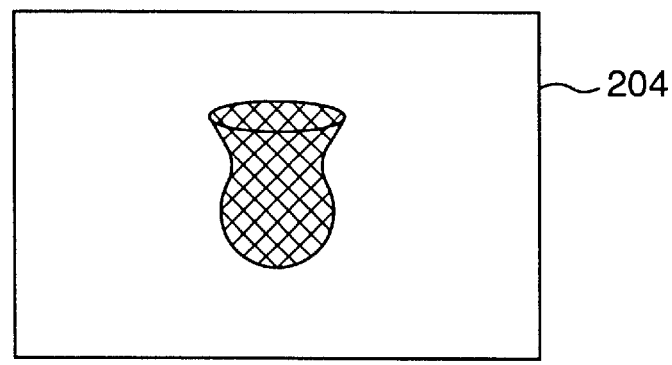

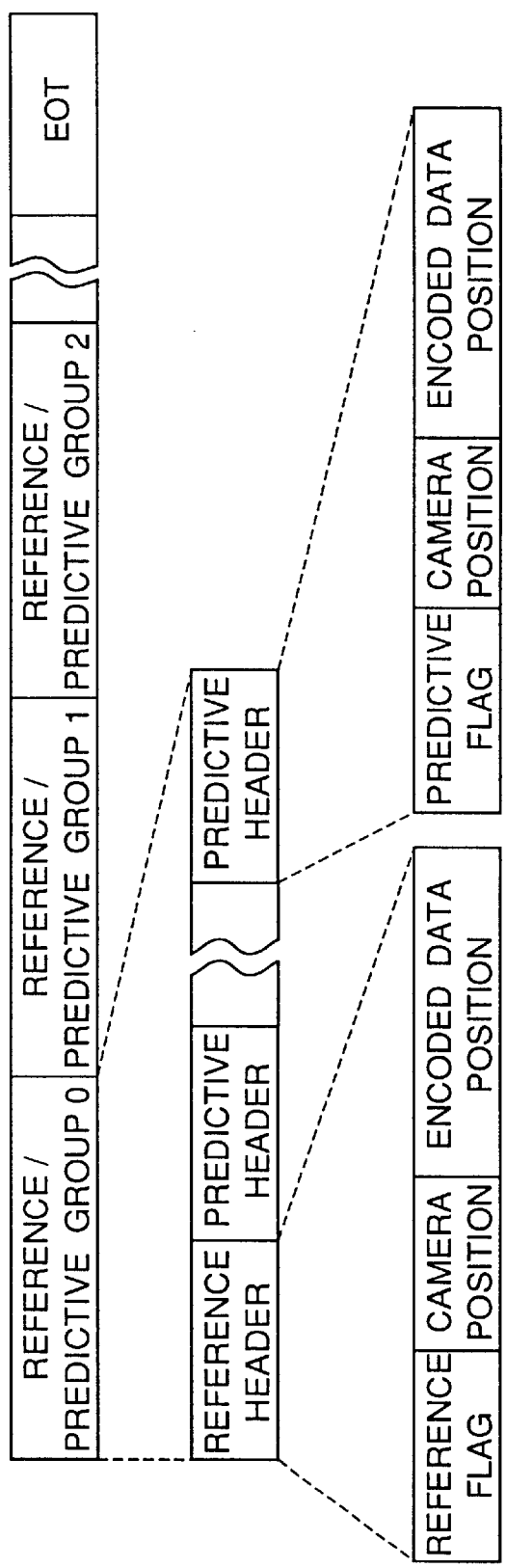
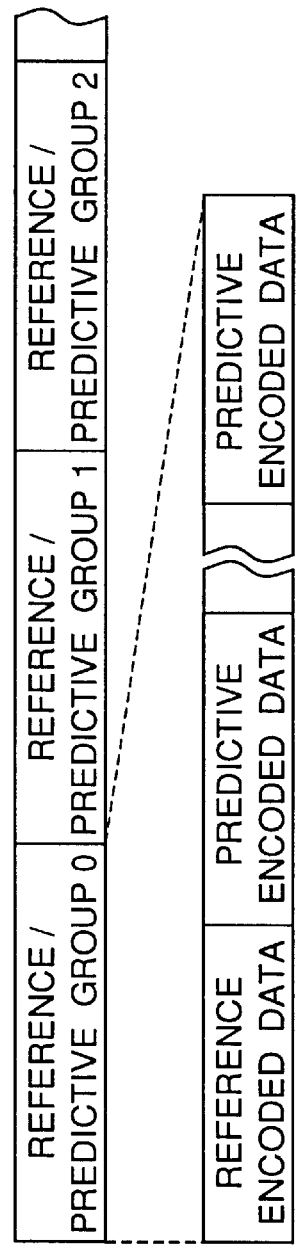

Fig.18

| REFERENCE IMAGE CAMERA POSITION | PREDICTIVE IMAGE CAMERA POSITION | DECODING |
|---|---|---|

1801

1802

| Decoding level | Decoding status |
|---|---|
| 1 | Modified reference image decoding complete |
| 2 | Predictive image decoding complete |

Fig.19

| 1 | POSITION P= REFERENCE IMAGE | P=R | | |
|---|---|---|---|---|
| 2 | | P≠R | | |
| 3 | POSITION P= PREDICTIVE IMAGE | Q≠R | | |
| 4 | | Q=R | P≠S | |
| 5 | | | P=S | L=1 |
| 6 | | | | L=2 |

| Status | Output data | | Destination | Decoding status table | | |
|---|---|---|---|---|---|---|
| 1 | 1 | | Output image selection unit | R | S | L |
| 2 | 1 | Reference coding data (P) | Reference image decoding unit | P | S | L |
| 3 | 0 | Reference coding data (Q) | Reference image decoding unit | Q | S | L |
| 4 | 2 | Predictive coding data (P) | Modified image decoding unit | R | P | 1 |
| 5 | 3 | Predictive coding data (P) | Predictive image decoding unit | R | P | 2 |
| 6 | 3 | | Output image selection unit | R | S | L |

*Fig.22*

| 1 | Position P= reference image | P is stored | |
|---|---|---|---|
| 2 | | P is not stored | |
| 3 | Position P= predictive image | P is not stored | Q is stored |
| 4 | | | Q is not stored |
| 5 | | P is stored | |

Fig.23

| Status | Destination | Output data |
|---|---|---|
| 1 | Output image selection unit | P |
| 2 | Reference image decoding unit | P Reference encoded data (P) |
| 3 | Predictive image decoding unit | P Reference image data (Q) Predictive encoded data (P) |
| 4 | Reference / predictive image decoding unit | P Reference encoded data (Q) Predictive encoded data (P) |
| 5 | Output image selection unit | P |

Fig.25

| 1 | P=R | | | |
|---|---|---|---|---|
| 2 | P≠R | Position P= reference image | P is stored | |
| 3 | | | P is not stored | |
| 4 | | Position P= predictive image | P is not stored | Q is stored |
| 5 | | | | Q is not stored |
| 6 | | | P is stored | |

Fig.26

| Status | Destination | Output data |
|---|---|---|
| 1 | Predictive encoded data selection unit | None |
| 2 | Image display unit | Image data (P) |
| 3 | Reference image decoding unit | Reference encoded data (P) |
| 4 | Predictive image decoding unit | Reference image data (Q) \| Predictive encoded data (P) |
| 5 | Reference / predictive image decoding unit | Reference encoded data (Q) \| Predictive encoded data (P) |
| 6 | Image display unit | Image data (P) |

Fig.27

| |
|---|
| P+ (0,1) |
| P+ (1,0) |
| P+ (0,−1) |
| P+ (−1,0) |
| P+ (1,1) |
| P+ (1,−1) |
| P+ (−1,−1) |
| P+ (−1,1) |

Fig.28

| | | | |
|---|---|---|---|
| 1 | Position S= reference image | S is not stored | |
| 2 | Position S= predictive image | S is not stored | T is stored |
| 3 | | S is not stored | T is stored |

Fig.29

| Status | Destination | Output data |
|---|---|---|
| 1 | Reference image decoding unit | Reference encoded data (P) |
| 2 | Predictive image decoding unit | Reference image data (Q) \| Predictive encoded data (P) |
| 3 | Reference / predictive image decoding unit | Reference encoded data (Q) \| Predictive encoded data (P) |

Fig. 33

IMAGE ENCODING/DECODING DEVICE AND METHOD

BACKGROUND TO THE INVENTION

1. Field of the Invention

The present invention relates to an image encoding device and image decoding device for the purpose of relaying and storing images.

2. Description of the Related Art

When expressing a three-dimensional object on a computer, the conventional method has been to simulate it by inputting information on the shape and surface material of the object into the computer, calculating how it looks. However, in order to express complex shapes and detailed texture, it has been necessary to input large amounts of data, and the scale of the calculations necessary for simulation is enormous.

There is a method known as image-based rendering for expressing three-dimensional objects with a smaller amount of calculation. This involves advance shooting, storing and relaying of images from a large number of viewpoints, which are then displayed in answer to requests (QuickTime VR: Chen S. E. 'QuickTime VR: an image-based approach to virtual environment navigation', SIGGRAPH 1990: 29–38, 1990).

With image-based rendering, images from a large number of viewpoints are shot in advance, so that the amount of data which needs to be stored and relayed is enormous, sometimes exceeding 10,000 images or about 2.4 gigabytes. The problem is, therefore, how to store and relay this data effectively.

In view of this problem which has hitherto existed, it is an object of the present invention to provide an image encoding device whereby a small number of representative images is selected from among the large number of images which are to be stored, relayed, and encoded effectively by using each representative image to express a plurality of images, and by appending their dependent relationships. It is a further object of the present invention to provide a method and a device whereby images are encoded and decoded effectively by virtue of decoding by stages and predicting the next request.

SUMMARY OF THE INVENTION

The first aspect of the present invention is an image encoding device characterised in that it has a device for reference/predictive grouping into which are input a plurality of images which are to be encoded and the relevant camera position data, and whereby the plurality of images which are to be encoded is grouped into reference images and predictive images which are predictively encoded from the reference images; a device for reference image encoding which encodes the reference images; a device for predictive image encoding which uses reconstructed reference images to encode predictive images; and a device for compiling a reference relationship table which compiles a reference relationship table detailing reference relationships, encoded data positions and camera positions, and outputs the reference relationship table and the encoded data.

The second aspect of the present invention is an image decoding device characterised in that it has a device for selecting encoded data into which are input requests for images which are to be reproduced, encoded data whereby the images have been encoded, and a reference relationship table detailing reference/predictive relationships, encoded data positions and camera positions, and whereby encoded data which is necessary for the decoding of the requested images is selected from the reference relationship table; a device for decoding reference images whereby encoded data is decoded and reconstructed reference images are output; and a device for decoding predictive images whereby encoded data is decoded and reconstructed predictive images are output.

The third aspect of the present invention is an image decoding device characterised in that it has a device for monitoring image requests into which are input a data position table detailing camera position, reference image encoded data position and predictive image encoded data position, together with (in the case of predictive image encoded data) encoded data characterised in that it comprises modified information vis-à-vis the reference image, and residual information vis-à-vis an image which has been modified using this modified information; a device for monitoring image requests whereby requests for images which are to be reproduced are monitored successively; a device for selecting encoded data whereby encoded data for decoding is selected from the image requests, image decoding status, data position table and encoded data; a device for decoding reconstructed reference images whereby reconstructed reference images are decoded from encoded data; a device for decoding modified reference images whereby modified reference images are decoded from modified information on reconstructed reference images and encoded data; and a device for decoding reconstructed predictive images whereby reconstructed predictive images are decoded from residual information on modified images and encoded data, output being executed selectively from the a device for decoding reconstructed reference images on the one hand, and the a device for decoding modified reference images and a device for decoding reconstructed predictive images on the other.

The fourth aspect of the present invention is an image decoding device characterised in that it has a device for selecting encoded data into which are input requests for images which are to be reproduced, a data position table detailing camera position, reference image encoded data position and predictive image encoded data position, and encoded data whereby the images have been encoded, and whereby encoded data for decoding is selected; a device for decoding reference images whereby reference images are decoded from encoded data; a device for storing reconstructed reference image groups whereby a plurality of reconstructed reference images is stored; a device for decoding predictive images whereby predictive images are decoded from encoded data; a device for storing reconstructed predictive image groups whereby a plurality of reconstructed predictive images is stored; and a device for checking image storage whereby the camera position of images which are to be stored is calculated in accordance with requests for images which are to be reproduced, and the number of images which are stored in the a device for storing reconstructed reference image groups and a device for storing reconstructed predictive image groups is maintained at a constant level or below, reproduced images being output from the images which are being stored, having completed the decoding process.

The fifth aspect of the present invention is an image decoding device characterised in that it has a device for monitoring image requests into which are input a data position table detailing camera position, reference image encoded data position and predictive image encoded data position, and whereby requests for images which are to be reproduced are monitored successively and image requests output; a device for selecting encoded data whereby encoded data for fresh decoding is selected from the current image request, previous image request, and information on images which have already been decoded and stored; a device for selecting predictive encoded data whereby encoded data on images close to the current image request in terms of camera position is selected; a device for decoding reference images whereby encoded data is decoded into reference images; a device for decoding predictive images whereby encoded data is decoded into predictive images; a device for storing reconstructed reference image groups whereby a plurality of reconstructed reference images is stored; and a device for storing reconstructed predictive image groups whereby a plurality of reconstructed predictive images is stored, image requests being monitored and reproduced while encoded data for images which are close to the current image request is selected and decoded.

The sixth aspect of the present invention is an image encoding device characterised in that it has a device for reference/predictive grouping into which are input a plurality of images which are to be encoded and the relevant camera position data, and whereby the plurality of images which are to be encoded is grouped into reference images and predictive images which are predicted from the reference images; a device for estimating modification constraint formulae whereby modification constraint formulae between reference images and predictive images are estimated; a device for reference image encoding which encodes the reference images; a device for constrained predictive image encoding whereby predictive images are encoded while constraining modifications in accordance with modification constraint formulae; and a device for compiling a reference relationship table which compiles a reference relationship table detailing reference relationships, encoded data positions and camera positions for reference/predictive groups, and outputs the reference relationship table and the encoded data.

The seventh aspect of the present invention is an image decoding device characterised in that it has a device for selecting encoded data into which are input requests for images which are to be reproduced, encoded data whereby the images have been encoded, and a reference relationship table detailing reference/predictive relationships, encoded data positions and camera positions, and whereby encoded data which is necessary for the decoding of the requested images is selected from the reference relationship table; a device for decoding reference images whereby reference image encoded data is decoded and reconstructed reference images are output; and a device for decoding constrained predictive images whereby predictive images are decoded while constraining modifications in accordance with modification constraint formulae, and reconstructed predictive images are output.

The eighth aspect of the present invention is an image encoding device characterised in that it has a device for reference/predictive grouping into which are input a plurality of images which are to be encoded, the relevant camera position data and light source position data, and whereby the plurality of images which are to be encoded is grouped into reference images and predictive images which are predicted from the reference images; a device for reference image encoding which encodes the reference images; a device for predictive image encoding which uses reconstructed reference images to encode predictive images; and a device for compiling a reference relationship table which compiles a reference relationship table detailing reference relationships, encoded data positions and camera positions, and outputs the reference relationship table and the encoded data.

The ninth aspect of the present invention is an image decoding device characterised in that it has a device for selecting encoded data into which are input requests for images which are to be reproduced, encoded data whereby the images have been encoded, and a reference relationship table detailing reference/predictive relationships, camera positions, light source positions and encoded data positions, and whereby encoded data which is necessary for the decoding of the requested images is selected from the reference relationship table; a device for decoding reference images whereby encoded data is decoded and reconstructed reference images are output; and a device for decoding predictive images whereby encoded data is decoded and reconstructed predictive images are output.

In the image encoding device to which the first aspect of the present invention pertains, the a device for reference/predictive grouping divides the images which are to be encoded from the input, namely a plurality of images which are to be encoded and the relevant camera position data, into a plurality of groups comprising reference images and predictive images, which are predicted from the reference images. The reference images are encoded by the a device for reference image encoding, while the device for predictive image encoding uses reconstructed reference images to encode the predictive images. The device for compiling a reference relationship table compiles a reference relationship table detailing the reference relationships of the predictive images vis-à-vis the reference images, encoded data positions and camera positions, and outputs the reference relationship table and the encoded data.

In the image decoding device to which the second aspect of the present invention pertains, requests for images which are to be reproduced, encoded data whereby the images have been encoded, and a reference relationship table detailing reference/predictive relationships, encoded data positions and camera positions form the input. The device for selecting encoded data selects from the reference relationship table data which is necessary for the decoding of the requested images.

If the selected encoded data is a reference image, it is decoded by the device for decoding reference images, and output in the form of a reconstructed reference image. If the selected encoded data is a predictive image, it is decoded by the device for decoding predictive images, and output in the form of a reconstructed predictive image.

In the image decoding device to which the third aspect of the present invention pertains, a data position table detailing camera position, reference image encoded data position and predictive image encoded data position, together with (in the case of predictive image encoded data) encoded data characterised in that it comprises modified information vis-à-vis the reference image, and residual information vis-à-vis the image which has been modified with the aid of this modified information. The device for monitoring image requests successively monitors requests for images which are to be reproduced. The device for selecting encoded data selects encoded data for decoding from the data position table and encoded data in accordance with image requests and image decoding status.

If the selected encoded data is reference image data, the device for decoding reconstructed reference images decodes it from the encoded data. If the selected encoded data is predictive image data, the device for decoding modified reference images or the device for decoding reconstructed predictive images decodes it. In the case of the device for decoding modified reference images, a modified reference image is restored from modified information on reconstructed reference images and encoded data. Meanwhile, in the case of the device for decoding reconstructed predictive images, a reconstructed predictive image is restored from residual information on modified images and encoded data. Outout of the device for decoding reconstructed reference images on the one hand, and the device for decoding modified reference images and device for decoding reconstructed predictive images on the other is executed selectively by virtue of the data position table in accordance with image requests and image decoding status.

In the image decoding device to which the fourth aspect of the present invention pertains, the input comprises requests for images which are to be reproduced, a data position table detailing camera position, reference image encoded data position and predictive image encoded data position, and encoded data whereby the images have been encoded.

The device for selecting encoded data has as its input requests for images which are to be restored, and selects encoded data decoding. If the selected encoded data is reference image data, the device for decoding reference images reconstructs the image. If the selected encoded data is predictive image data, the device for decoding predictive images reconstructs it. As a result, the images are stored in the device for storing reconstructed reference image groups, and the device for storing reconstructed predictive image groups respectively. At this time, the device for checking image storage calculates the camera position of the images which are to be stored in accordance with the requests for images which are to be reproduced, and determines which stored images are to be disposed of in order to maintain the number of images which are stored in the device for storing reconstructed reference image groups and device for storing reconstructed predictive image groups at a constant level or below. The images which are to be output are selected from among the images which are being stored, having completed the decoding process.

In the image decoding device to which the fifth aspect of the present invention pertains, the input comprises a data position table detailing camera position, reference image encoded data position and predictive image encoded data position. The device for monitoring image requests successively monitors requests for images which are to be reproduced, and outputs image requests. The device for selecting encoded data selects encoded data for fresh decoding from the current image request, previous image request, and information on images which have already been decoded and stored. Meanwhile, the device for selecting predictive encoded data selects encoded data on images close to the current image request in terms of camera position. If the encoded data which is selected by the above two device for selection is reference image data, the device for decoding reference images reconstructs the image. If it is predictive image data, the device for decoding predictive images reconstructs it. As a result, the images are stored in the device for storing reconstructed reference image groups, and the device for storing reconstructed predictive image groups respectively.

In this manner, image requests are monitored and reproduced, while encoding data on images close to the current image request is selected and decoded, and the image is output.

In the image encoding device to which the sixth aspect of the present invention pertains, the input comprises a plurality of images which are to be encoded and the relevant camera position data. The means for reference/predictive grouping groups the plurality of images which are to be encoded into reference images on the one hand, and predictive images which are predicted from the reference images on the other. The device for estimating modification constraint formulae estimates modification constraint formulae between reference images and predictive images.

The device for reference image encoding encodes the reference images. The device for constrained predictive image encoding encodes predictive images while constraining modifications in accordance with modification constraint formulae. The device for compiling a reference relationship table compiles a reference relationship table detailing reference relationships, encoded data positions and camera positions for reference/predictive groups, and outputs the reference relationship table and the encoded data.

In the image decoding device to which the seventh aspect of the present invention pertains, requests for images which are to be reproduced, encoded data whereby the images have been encoded, and a reference relationship table detailing reference/predictive relationships, encoded data positions and camera positions form the input. The device for selecting encoded data selects encoded data which is necessary for the decoding of the requested images from the reference relationship table. The device for decoding reference images decodes reference image encoded data and outputs reconstructed reference images. The device for decoding constrained predictive images decodes predictive images while constraining modifications in accordance with modification constraint formulae, and outputs reconstructed predictive images.

In the image encoding device to which the eighth aspect of the present invention pertains, a plurality of images which are to be encoded, the relevant camera position data and light source position data form the input. The device for reference/predictive grouping groups the plurality of images which are to be encoded into reference images, and predictive images which are predicted from the reference images, while the device for reference image encoding encodes the reference images. The device for predictive image encoding uses reconstructed reference images to encode predictive images. The device for compiling a reference relationship table compiles a reference relationship table detailing reference relationships, encoded data positions and camera positions, and outputs the reference relationship table and the encoded data.

In the image decoding device to which the ninth aspect of the present invention pertains, the input comprises requests for images which are to be reproduced, encoded data whereby the images have been encoded, and a reference relationship table detailing reference/predictive relationships, camera positions, light source positions and encoded data positions.

The device for selecting encoded data selects data which is necessary for the decoding of the requested images from the reference relationship table. The device or decoding reference images decodes encoded data and outputs reconstructed reference images. Meanwhile, the device for decoding predictive images decodes encoded data and outputs reconstructed predictive images.

BRIEF DESCRIPTION OF THE DRAWINGS

FIG. 2 is a diagram illustrating the configuration of the image data;

FIG. 5 is a diagram illustrating camera position data and image data arranged by reference/predictive group;

FIG. 8 is a diagram illustrating camera position data and image data arranged by reference/predictive group;

FIG. 9 is a diagram illustrating a reference relationship table;

FIG. 10 is a diagram illustrating encoded data;

FIG. 18 is a diagram illustrating a decoding status storage table;

FIG. 19 is a diagram illustrating a status table for the encoded data selection unit (1705);

FIG. 22 is a diagram illustrating a status table for the encoded data selection unit (2104);

FIG. 23 is a diagram illustrating an output data table for the encoded data selection unit (2104);

FIG. 25 is a diagram illustrating a status table for the encoded data selection unit (2405);

FIG. 26 is a diagram illustrating an output data table for the encoded data selection unit (2405);

FIG. 27 is a diagram illustrating a predictive table;

FIG. 28 is a diagram illustrating a status table for the predictive encoded data selection unit (2409);

FIG. 29 is a diagram illustrating an output data table for the predictive encoded data selection unit (2409);

FIG. 33 is a diagram illustrating image data with added epipolar parameters;

DESCRIPTION OF THE PREFERRED EMBODIMENTS

There follows a description of a number of embodiments of the present invention with reference to the drawings.

Figure 1:
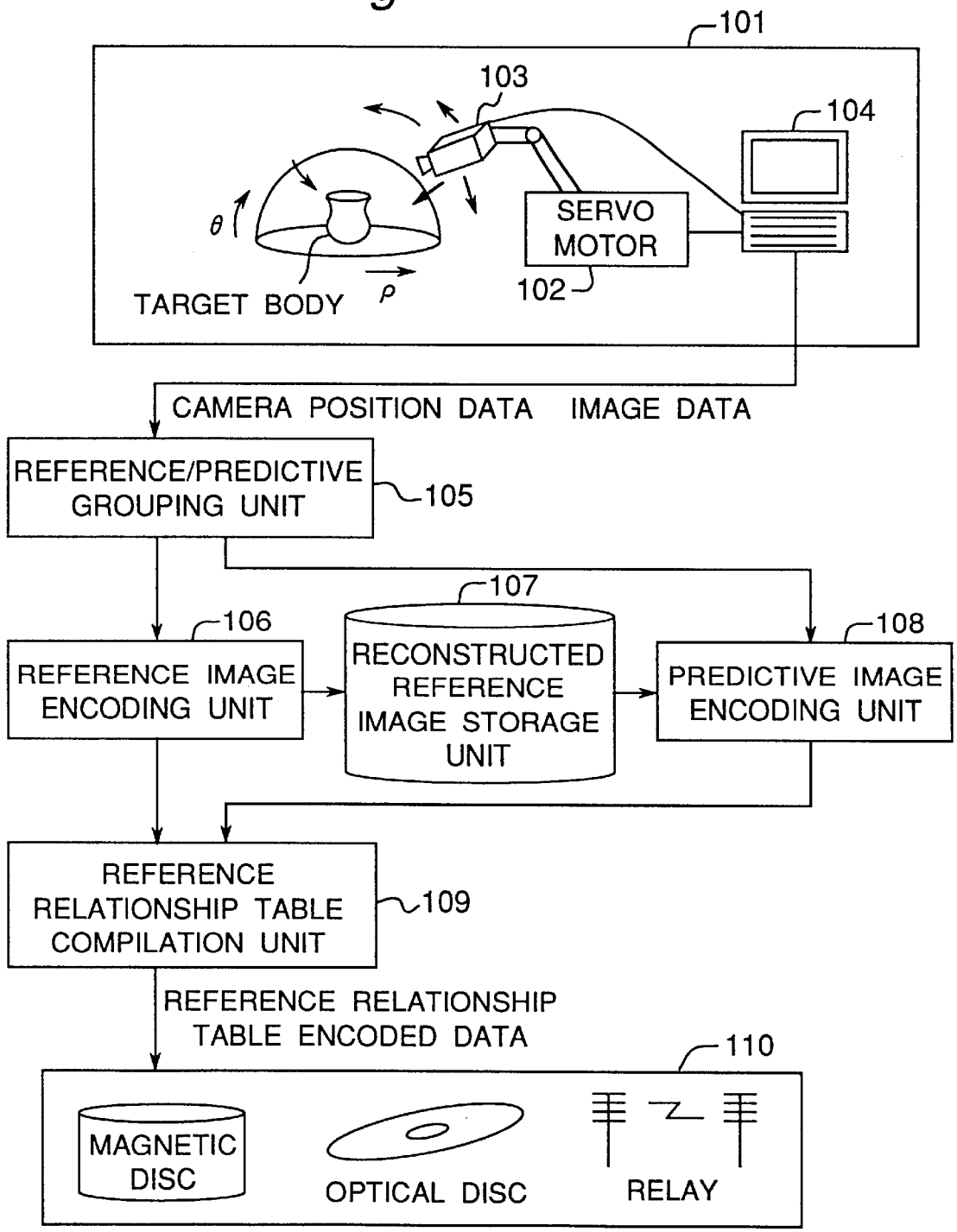
FIG. 1 is a block diagram of the image encoding device to which the first embodiment of the present invention pertains.

FIG. 1 is a block diagram of the image encoding device to which the first embodiment of the present invention pertains, and will be used to explain the configuration of the present embodiment.

In the drawing, a camera position control type image pickup device (101) shoots an image of the object and outputs camera position data and image data. A reference/predictive grouping unit (105) groups the camera position data and image data into reference/predictive groups comprising reference images and at least one predictive image. It outputs reference images to a reference image encoding unit (106), and predictive images to a predictive image encoding unit (108).

The reference image encoding unit (106) encodes reference images, and prepares reconstructed reference images. It outputs the encoded data to a reference relationship table compilation unit (109), and the reconstructed reference images to a reconstructed reference image storage unit (107). The reconstructed reference image storage unit (107) stores the reconstructed reference images, and outputs them to the predictive image encoding unit (108).

The predictive image encoding unit (108) encodes predictive images, and outputs the encoded data to the reference relationship table compilation unit (109). From the encoded data, the reference relationship table compilation unit (109) compiles a reference relationship table detailing reference relationships, encoded data positions and camera positions, outputting the reference relationship table and encoded data to a data record/relay unit (110). The data record/relay unit (110) records and relays according to use.

Provided next is a description of the action of the image encoding device to which the present embodiment pertains and which is configured in the above manner.

First, the camera position control type image pickup device (101) shoots images from different viewpoints in such a manner as to cover the periphery of the object. A computer causes a servo motor (102) to move the camera (103) to a position r degrees from the front of the object in a horizontal direction and q degrees from the horizontal plane in a vertical direction, and a computer (104) acquires data on the camera position and image. The image data separates the object from its background by a chroma key, and adds an alpha plane representing transparency information. It comprises a brightness plane (201), color 1 plane (202), color 2 plane (203) and alpha plane (204).

Here, ρ and θ are:

$$0 \leq \rho < 360, 0 \leq \theta \leq 90, (\rho, \theta \text{ are integers}) \qquad (1)$$

Figure 3:
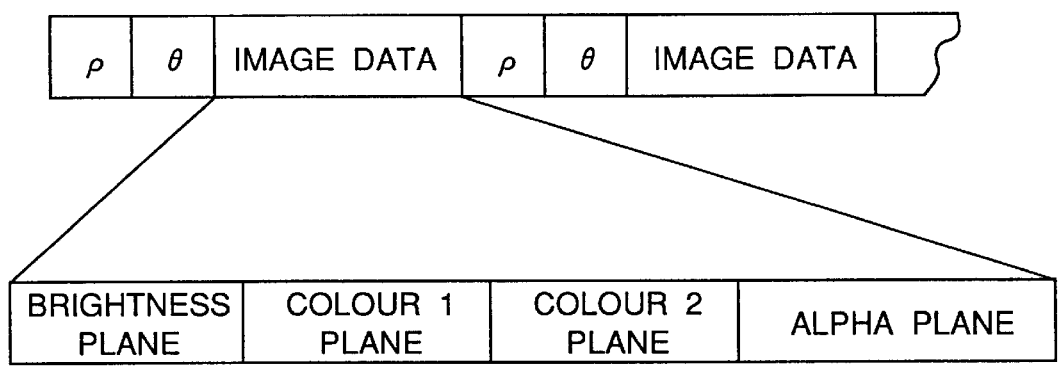
FIG. 3 is a diagram illustrating camera position data and image data.
Figure 4:
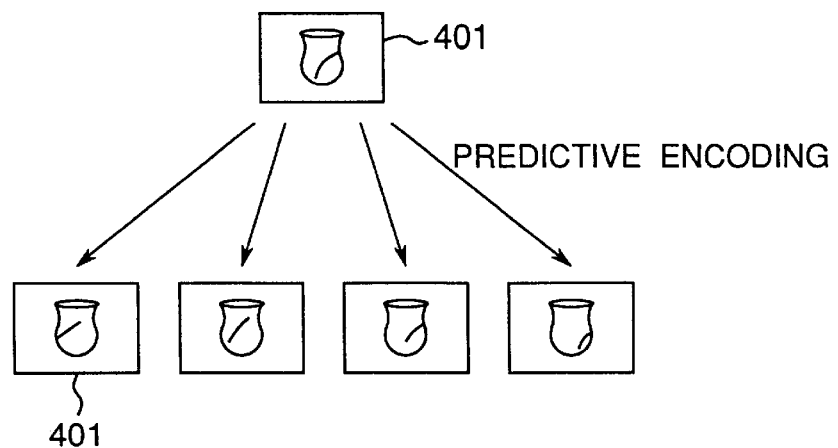
FIG. 4 is a diagram explaining predictive encoding.

The camera position and image data acquired in this manner is output, as shown in FIG. 3, in a format whereby the horizontal camera angle ρ and vertical camera angle θ are prefixed to each piece of image data.

In order to encode predictively as predictive images (402) those images which are approximated by reference images (401), the reference/predictive grouping unit (105) arranges reference images equidistantly in the space ρ–θ. Meanwhile, in order to group images in the vicinity of the reference images into predictive images predicted from those reference images, camera position P=(ρ, θ) is used to allocate reference image or predictive image flags f (P) to the respective images as below.

$$f(P) = \begin{cases} 0 & P = (Sn, Sm) \\ 1 & \text{Otherwise} \end{cases} \qquad (2)$$

(n, m are integers)
In addition, an index n (P) is allocated as follows.

$$n(P) = \left\lceil \frac{359}{S} \right\rceil \times n + m, n, m = \min_{m,n} d(P, Q) \qquad (3)$$

In the above, Q=(Sn, Sm). S is the space between reference images, and S=5. $\lceil \cdot \rceil$ represents an integer not in excess of ·. Moreover, because of the return at the camera position in the horizontal direction, $$P_1=(\rho_1,\theta_1), P_2=(\rho_2,\theta_2) \qquad (4)$$

Thus, $$d(P_1,P_2)=\min((\rho_1-\rho_2)^2,(\rho_1-\rho_2-360)^2, (\rho_1-\rho_2+360)^2)+(\theta_1-\theta_2)^2 \qquad (5)$$

Figure 5:
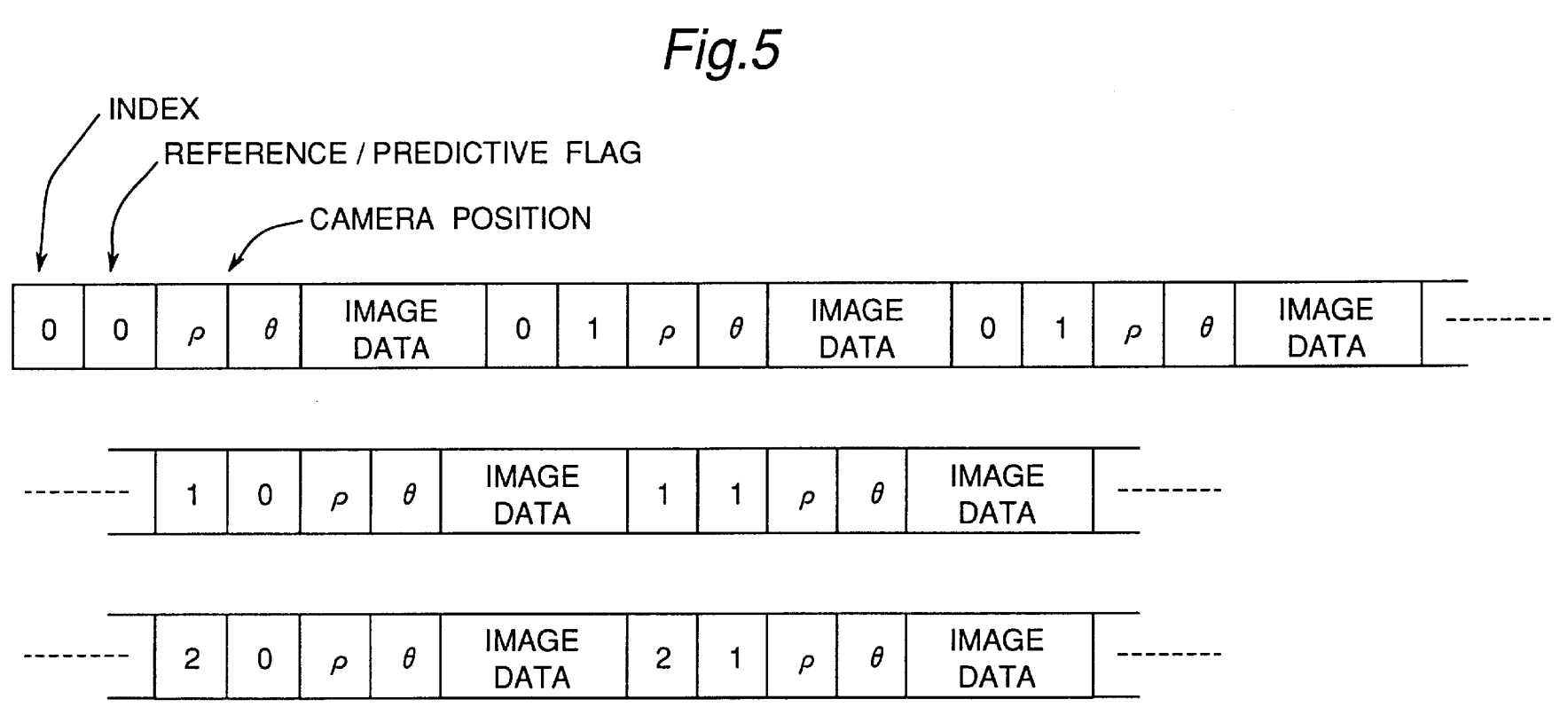

These are output in the index order in the format shown in FIG. 5, reference images to the reference image encoding unit (106), and predictive images to the predictive image encoding unit (107).

An example of a method of encoding which may be applied to the reference image encoding unit (106) is the I-PICTURE moving image encoding method which is in the process of standardisation under MPEG4 (MPEG Video Group, 'MPEG-4 Video Verification Model Version 5.0, ISO/IEC JTC1/SC29/WG11 Document N1469, 1996), which includes an alpha plane and decodes reference images in such a manner that they can be encoded with just their image data or decoded with just their encoding data.

Figure 6:
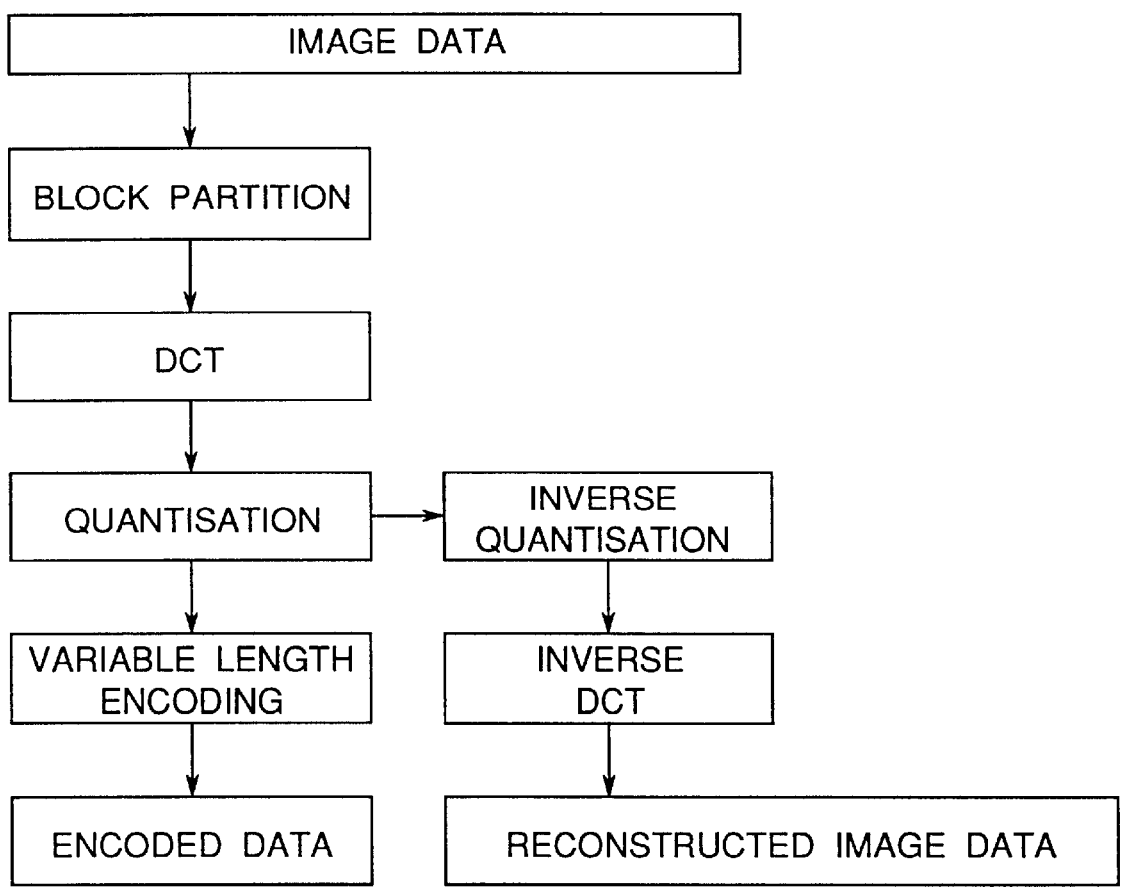
FIG. 6 is a flowchart illustrating a reference image encoding unit.

Using this method, reference images are encoded by the reference image encoding unit (106), and the encoded data is output to the reference relationship table compilation unit (109), while reconstructed predictive images are output to the reconstructed predictive image storage unit (107). FIG. 6 is a flowchart illustrating a reference image encoding unit.

Reconstructed predictive images are stored in the reconstructed predictive image storage unit (107), and output to the predictive image encoding unit (108). Although the as reference images and predictive images are arranged in the reference/predictive grouping unit (105) as shown in FIG. 5 prior to outputting, it is sufficient for the predictive image encoding unit (108) to have the capacity of one image.

Figure 7:
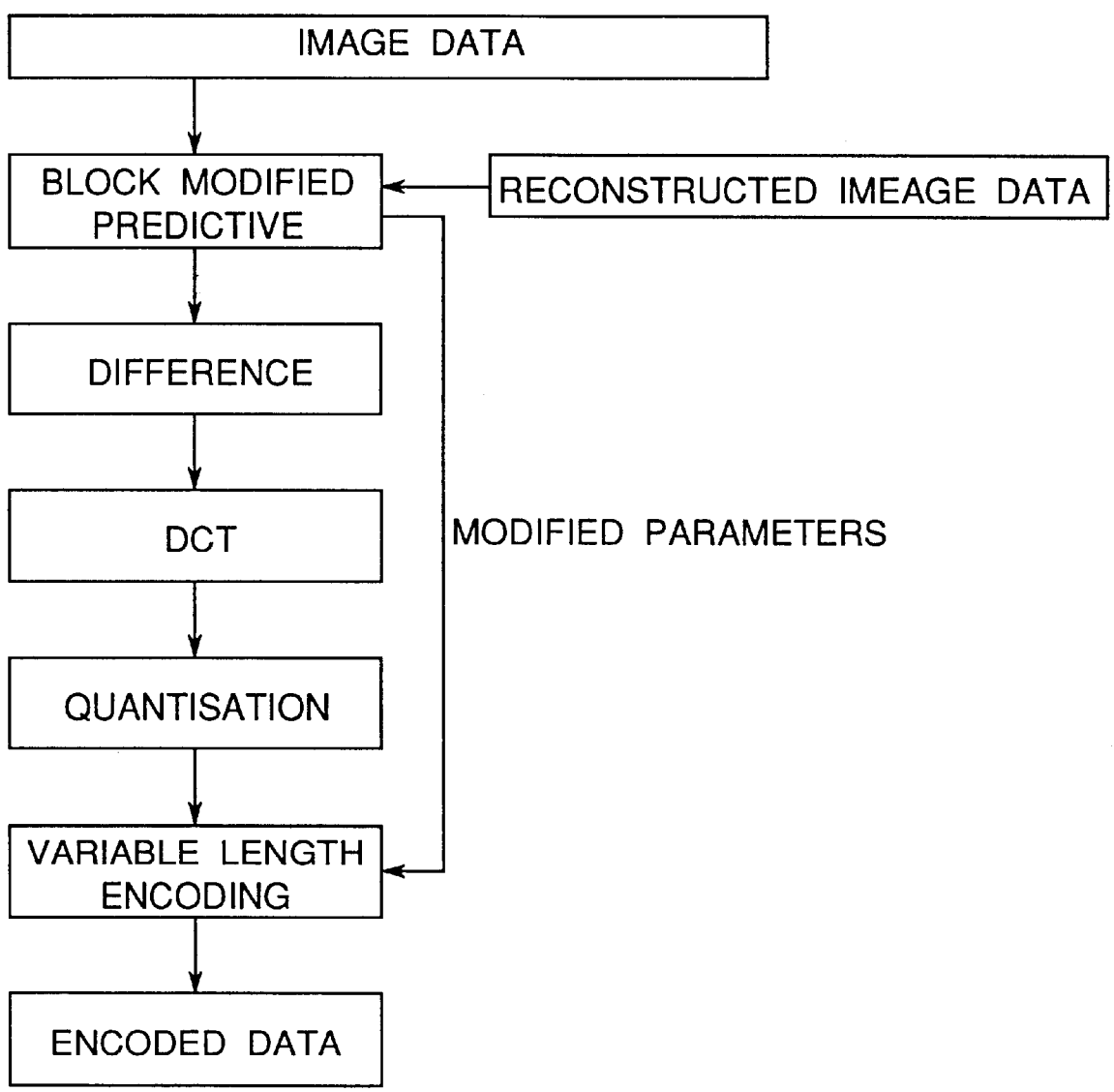
FIG. 7 is a flowchart illustrating a predictive image encoding unit.

The predictive image encoding unit (108) makes use of reconstructed reference images to encode predictive images. As with reference images, an example of a method of encoding predictive images which includes an alpha plane is the MPEG4 P-PICTURE moving image encoding method. This method is used to encode predictive images, and the encoded data is output to the reference relationship table compilation unit (109). FIG. 7 is a flowchart illustrating a predictive image encoding unit.

Figure 8:
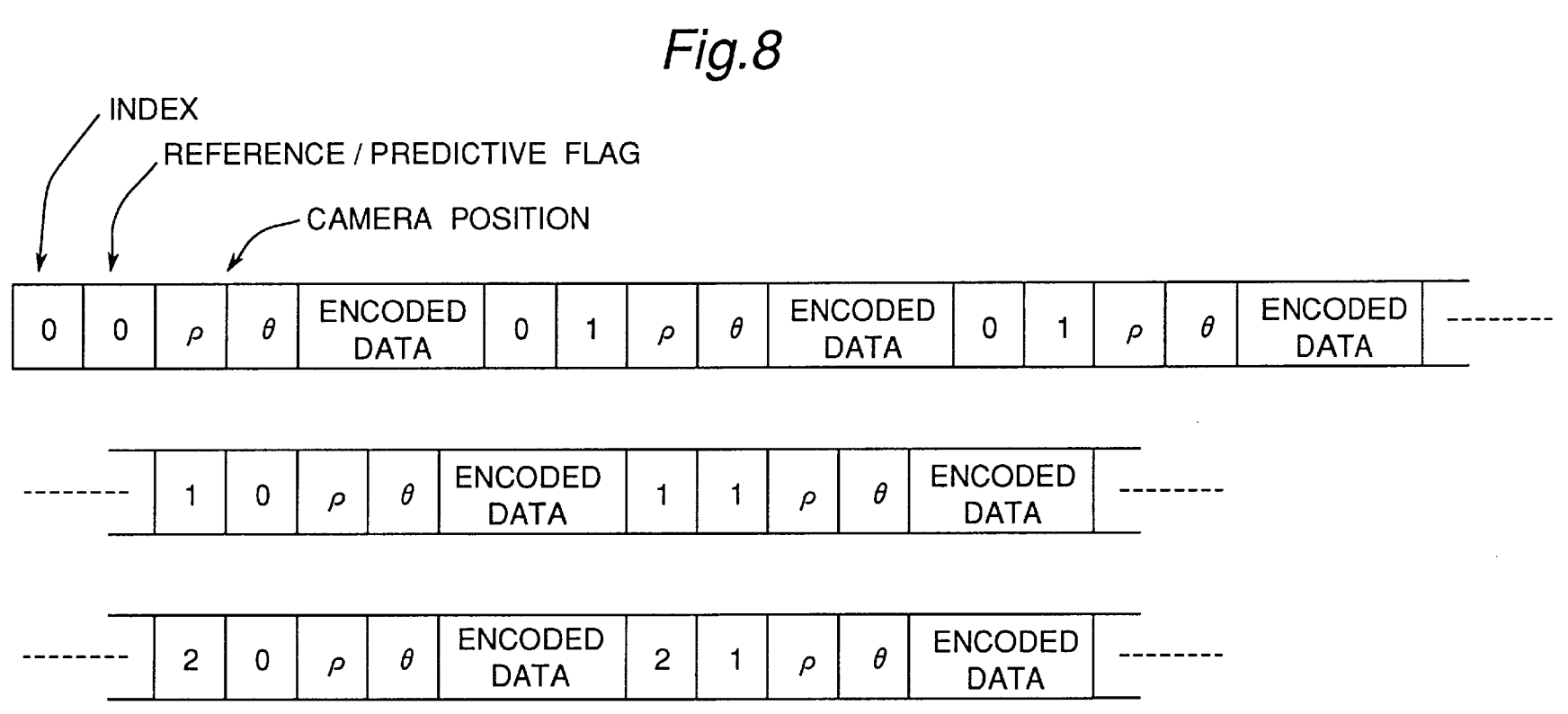

The reference relationship table compilation unit (109) scans data of the type illustrated in FIG. 8 which has been output from each of the encoding units. It compiles a reference relationship table and encoding data as shown in FIGS. 9 and 10 respectively, outputting them to the data record/relay unit (110).

The data record/relay unit (110) stores the reference relationship table and encoding data on a magnetic or optical disc, or relays them on a network or the like.

In this manner, the first embodiment of the present invention makes it possible to group multi-viewpoint images shot from a large number of different viewpoints into reference images (neighbouring images with similar camera position data) and one or more predictive images, which permits effective encoding. Moreover, it arranges the images by reference/predictive group in such a manner that the reference images come at the head, before outputting them to the device for encoding, thus reducing the amount of calculation and the storage capacity required for calculation. Furthermore, by adding a table in which the encoded data positions are stored in the order in which they are arranged, it facilitates effective decoding which is consistent with random access.

Figure 11:
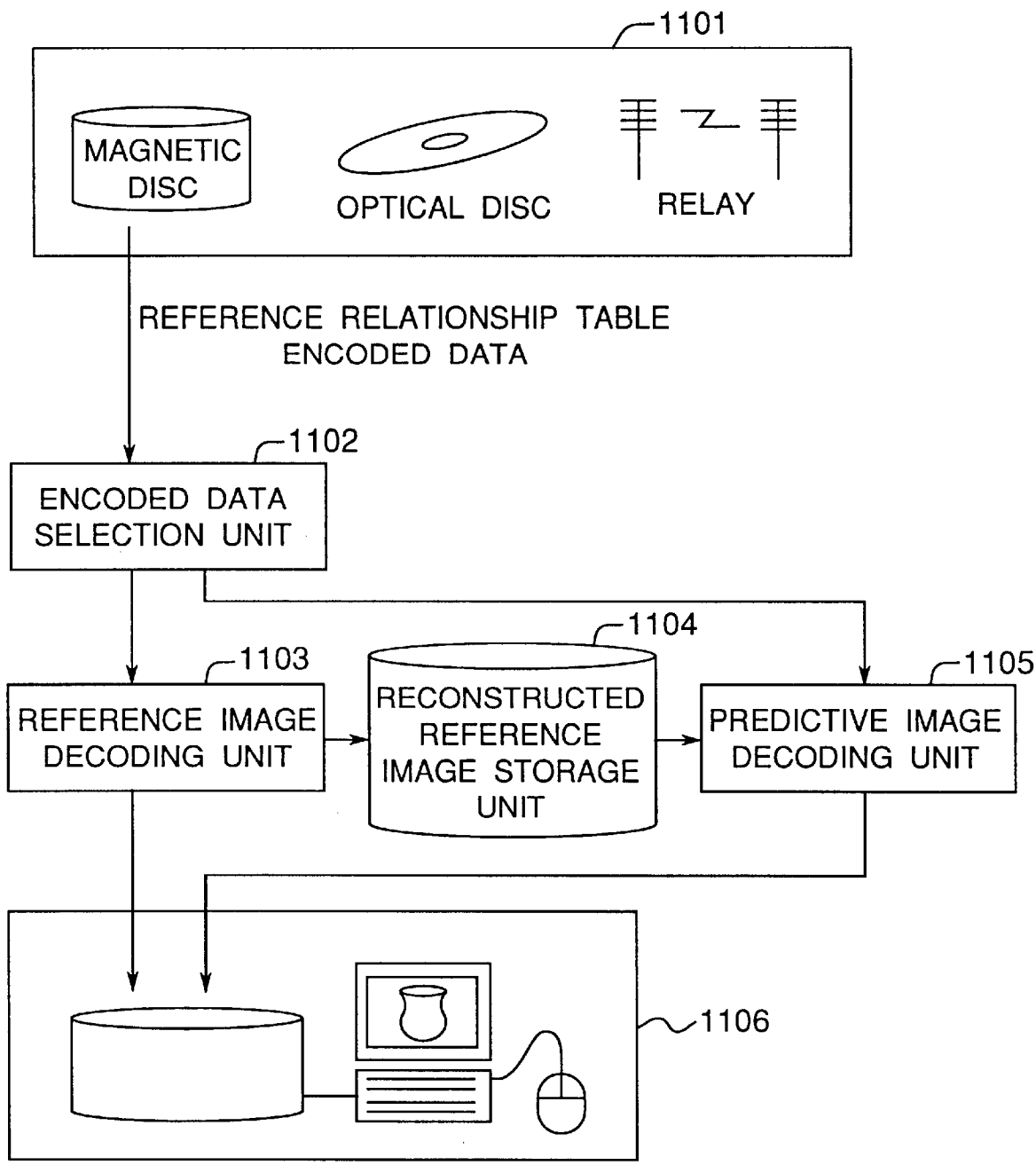
FIG. 11 is a block diagram of the image decoding device to which the second embodiment of the present invention pertains.

FIG. 11 is a block diagram of the image decoding device to which the second embodiment of the present invention pertains, and will be used to explain the configuration of the present embodiment.

In the drawing, a data record/relay unit (1101) stores/relays reference relationship tables and encoded data, and outputs them to an encoded data selection unit (1102). The encoded data selection unit (1102) searches the reference relationship table to locate data, and outputs the relevant encoded data to a reference image decoding unit (1103) or predictive image decoding unit (1105). The reference image decoding unit (1103) decodes reference image encoding data and outputs it to a reconstructed reference image storage unit (1104), and if necessary to device for image display (1106).

The reconstructed reference image storage unit (1105) stores reconstructed reference images, and outputs them to the predictive image decoding unit (1105). The predictive image decoding unit (1105) decodes the predictive image encoded data, and outputs the reconstructed reference image to the image display unit (1106). The image display unit (1106) stores the input images and displays them on request.

Provided next is a description of the action of the image decoding device to which the present embodiment pertains and which is configured in the above manner.

The data record/relay unit (1101) stores/relays reference relationship tables and encoded data, and outputs them to the encoded data selection unit (1102).

The encoded data selection unit (1102) searches the reference relationship table to locate the data, and acquires the relevant encoded data on the encoded data position from the data record/relay unit (1101). It outputs a reference/predictive flag and reference encoded data to the reference image decoding unit (1103). If there is any predictive encoded data, it outputs it to the predictive image decoding unit (1105). However, if the reference encoded data which is output to the reference image decoding unit (1103) is the same as the previous, the action of outputting it to the reference image decoding unit (1103) is omitted because it has already been decoded and stored. The reference image decoding unit (1103) decodes the reference image encoded data in which the reference image has been encoded, and outputs it to the reconstructed reference image storage unit (1104).

At the reference/predictive flag, reference images are output to the image display unit (1106) as reconstructed reference images. The reconstructed reference image storage unit (1104) stores reconstructed reference images, and outputs them to the predictive image decoding unit (1105).

The predictive image decoding unit (1105) uses reconstructed reference images to decode the predictive image encoded data in which predictive images are encoded, and outputs reconstructed predictive images to the image display unit (1106).

The image display unit (1106) stores the decoded images and displays them in response to a search with a mouse which is connected to the computer.

In the above manner, the present embodiment makes it possible to group images shot from a large number of different viewpoints which have neighbouring camera positions, and by using a table which details reference relationships, encoded data positions and camera positions, effectively to decode encoded data in which the groups have been encoded predictively.

Moreover, since the reference relationship table is ordered by group, it is possible to store the reconstructed reference images and effectively decode images by just decoding predictive encoded data.

Figure 12:
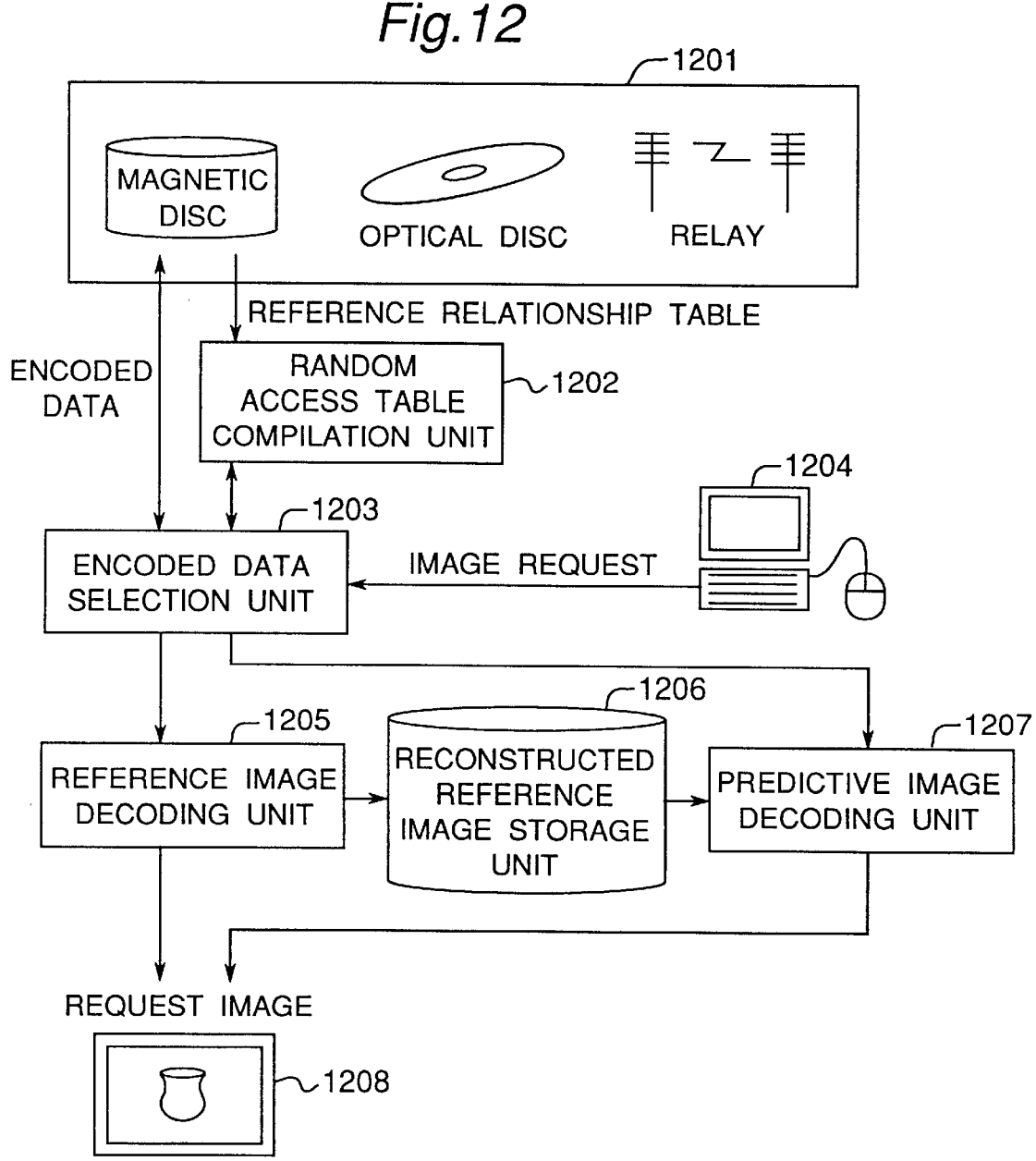
FIG. 12 is a block diagram of the image decoding device to which the third embodiment of the present invention pertains.

FIG. 12 is a block diagram of the image decoding device to which the third embodiment of the present invention -pertains, and will be used to explain the configuration of the present embodiment.

In the drawing, a data record/relay unit (1201) stores/relays reference relationship tables and encoded data, and outputs the reference tables to a random access table compilation unit (1202) and the encoded data to an encoded data selection unit (1203). An image request unit (1204) outputs the camera positions of requested images to the encoded data selection unit (1203). The random access table compilation unit (1202) converts the tables from camera position to encoded data in such a way as to effectively enable random access.

In response to the image requests, the encoded data selection unit (1203) searches for the position of the required data from the random access table, outputting it to a reference image decoding unit (1205) or predictive image decoding unit (1207). The reference image decoding unit (1205) decodes the reference image encoded data, and outputs reconstructed reference images to a reconstructed reference image storage unit (1206), and if necessary to an image display unit (1208).

The reconstructed reference image storage unit (1206) stores reconstructed reference images, and outputs them to the predictive image decoding unit (1207). The predictive image decoding unit (1207) decodes the predictive image encoded data, and outputs the reconstructed reference image to the image display unit (1207). The image display unit (1208) displays the input images.

Provided next is a description of the action of the image decoding device to which the present embodiment pertains and which is configured in the above manner.

The data record/relay unit (1201) stores/relays reference relationship tables and encoded data, and outputs the reference tables to the random access table compilation unit (1202). It also outputs the encoded data to the encoded data selection unit (1203) in response to requests from that unit.

When the user operates a mouse connected to the computer and designates a viewpoint position which he wishes to see, the image request unit (1204) outputs the camera position corresponding to that viewpoint position to the encoded data selection unit (1203).

Figure 13:
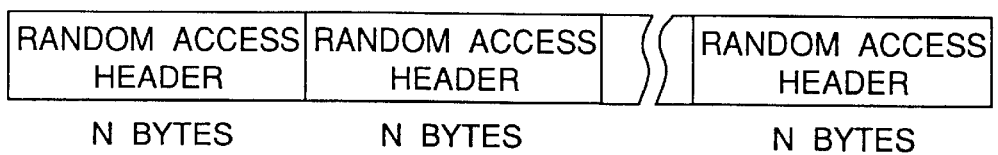
FIG. 13 is a diagram illustrating a random access table.
Figure 14:
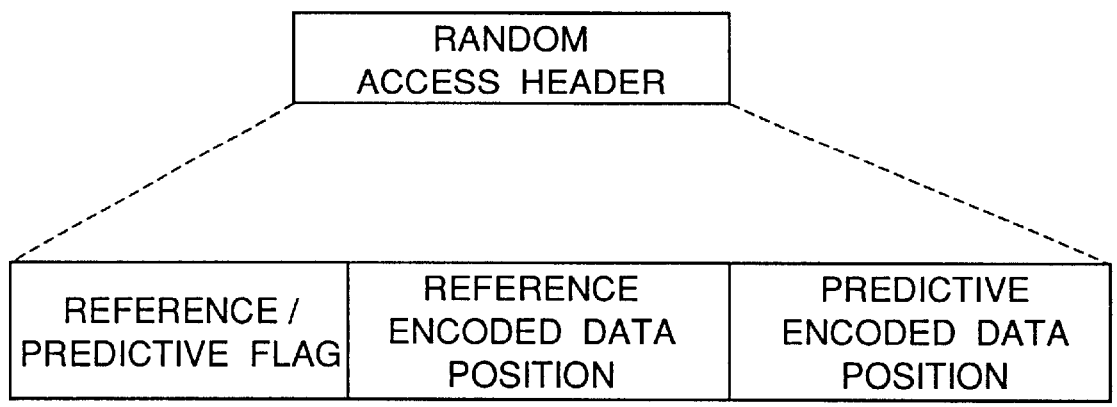
FIG. 14 is a diagram illustrating the configuration of the random access header.

The random access table compilation unit (1202) compiles a reference relationship random access table as illustrated in FIG. 9 in order to make it possible to effectively search for an encoded data position from a camera position. The reference headers and predictive headers illustrated in FIG. 9 are converted to random access headers (N bytes) as in FIG. 13, and the random access header of the camera position ($\rho$, $\theta$) is placed in a position $$(359\rho+\theta)N \quad (6)$$

from the head of the random access table, thus producing a random access table as illustrated in FIG. 14.

However, in the case of reference images, the predictive encoded data position column is left blank.

Using the camera position data (a, b) of the requested image, the encoded data selection unit (1203) searches for the random access header of a position $$(359\alpha+\beta)N \quad (7)$$

from the head of the random access table, and acquires encoded data on encoded data positions from the data record/relay unit (1201). It outputs a reference/predictive flag and reference encoded data to the reference image decoding unit (1205). If there is any predictive encoded data, it outputs it to the predictive image decoding unit (1207).

However, if the reference encoded data which is output to the reference image decoding unit (1205) is the same as the previous, the action of outputting it to the reference image decoding unit (1205) is omitted because it has already been decoded and stored.

The reference image decoding unit (1205) decodes the reference image encoded data in which the reference image has been encoded, and outputs it to the reconstructed reference image storage unit (1206). At the reference/predictive flag, reference images are output to the image display unit (1208) as reconstructed reference images, The reconstructed reference image storage unit (1206) stores reconstructed reference images, and outputs them to the predictive image decoding unit (1207).

The predictive image decoding unit (1107) uses reconstructed reference images to decode the predictive image encoded data in which predictive images are encoded, and outputs reconstructed predictive images to the image display unit (1208). The image display unit (1208) displays the input images.

In the above manner, the present embodiment makes it possible to group and predictively encode, in an efficient manner, images which have been shot from a large number of different viewpoints with neighbouring camera positions, and by using a table which details reference relationships, encoded data positions and camera positions, effectively to search for, decode and display images from a desired camera position. Moreover, images which are requested consecutively frequently have neighbouring camera positions and belong to the same reference/predictive group, and by storing reconstructed reference images it is possible effectively to decode and display images by just decoding predictive encoded data.

Figure 15:
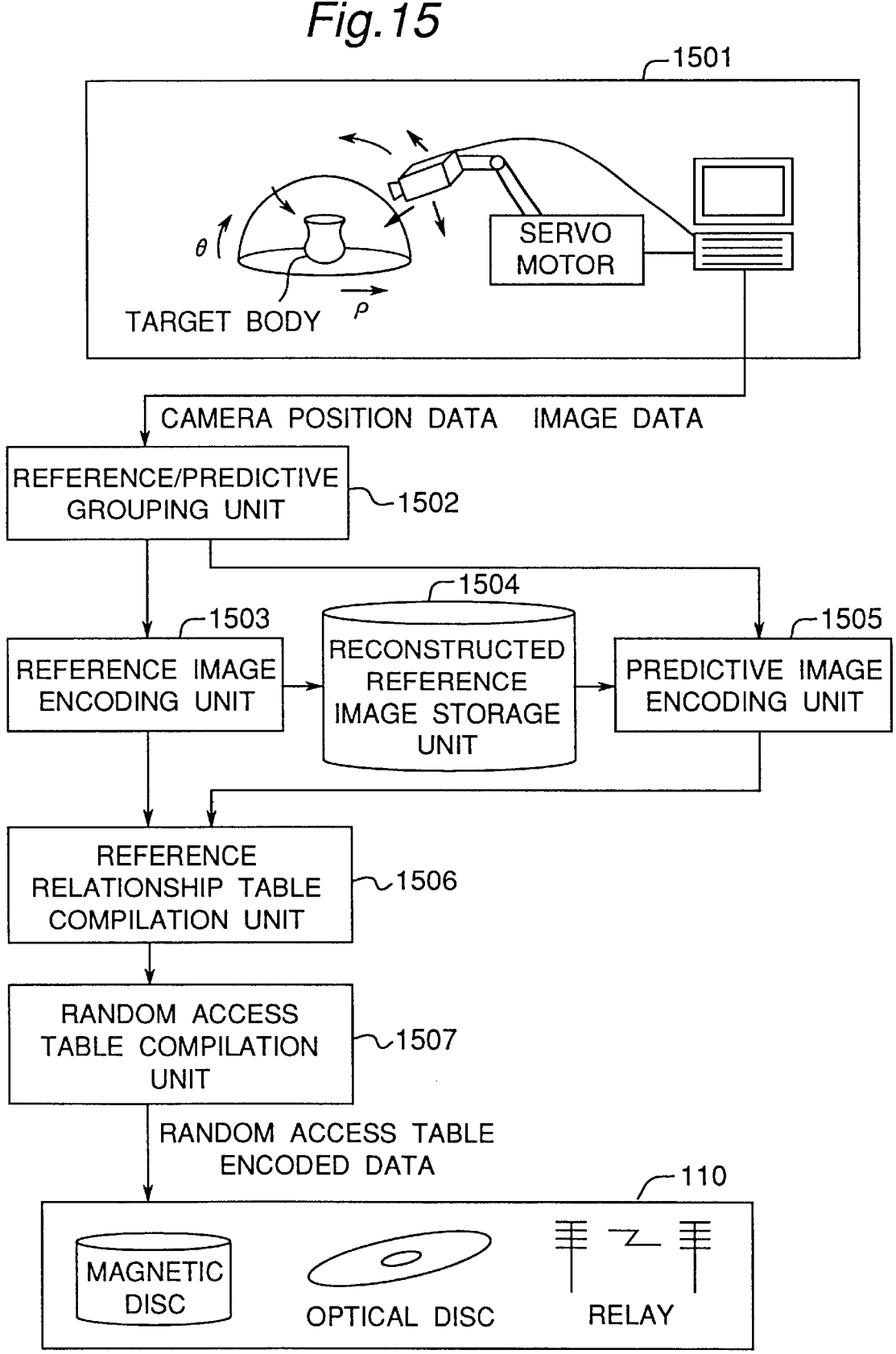
FIG. 15 is a block diagram of the image encoding device to which the fourth embodiment of the present invention pertains.

FIG. 15 is a block diagram of the image encoding device to which the fourth embodiment of the present invention pertains, and will be used to explain the configuration of the present embodiment.

In the drawing, a camera position control type image pickup device (1501) shoots an image of the object and outputs camera position data and image data. A reference/predictive grouping unit (1502) groups the camera position data and image data into reference/predictive groups comprising reference images and at least one predictive image. It outputs reference images to a reference image encoding unit (1503), and predictive images to a predictive image encoding unit (1505). The reference image encoding unit (1503) encodes reference images, and prepares reconstructed reference images. It outputs the encoded data to a reference relationship table compilation unit (1506), and the reconstructed reference images to a reconstructed reference image storage unit (1504). The reconstructed reference image storage unit (1504) stores the reconstructed reference images, and outputs them to the predictive image encoding unit (1505). The predictive image encoding unit (1505) encodes predictive images, and outputs the encoded data to the reference relationship table compilation unit (1506). From the encoded data, the reference relationship table compilation unit (1506) compiles a reference relationship table detailing reference relationships, encoded data positions and camera positions, outputting the reference relationship table and encoded data to a random access table compilation unit (1507).

The random access table compilation unit (1507) converts the tables from camera position to encoded data in such a way as effectively to enable random access, and outputs the random access table and encoded data to a data record/relay unit (1508). The data record/relay unit (1508) records and relays according to use.

There follows a description of the action of the image encoding device to which the present embodiment pertains and which is configured in the above manner.

First, the camera position control type image pickup device (1501) is the same as the camera position control type image pickup device (101). The reference/predictive grouping unit (1502) is the same as the reference/predictive grouping unit (105). The reference image encoding unit (1503) is the same as the reference image encoding unit (106). The reconstructed reference image storage unit (1504) is the same as the reconstructed reference image storage unit (107). The predictive image encoding unit (1505) is the same as the predictive image encoding unit (108). The reference relationship table compilation unit (1506) is the same as the reference relationship table compilation unit (109).

The random access table compilation unit (1507) compiles random access tables in the same manner as the random access table compilation unit (1202), and outputs the encoded data and random access tables to the data record/relay unit (110).

The data record/relay unit (110) stores the random access table and encoding data on a magnetic or optical disc, or relays them on a network or the like.

In this manner, the present embodiment makes it possible to group multi-viewpoint images shot from a large number of different viewpoints into reference images (neighbouring images with similar camera position data) and one or more predictive images, which permits effective encoding. Moreover, it arranges the images by reference/predictive group in such a manner that the reference images come at the head, before outputting them to the device for encoding, thus reducing the amount of calculation and the storage capacity required for calculation. Furthermore, by adding a table in which the encoded data positions are stored in the order in which they are arranged, it facilitates effective decoding which is consistent with random access.

Figure 16:
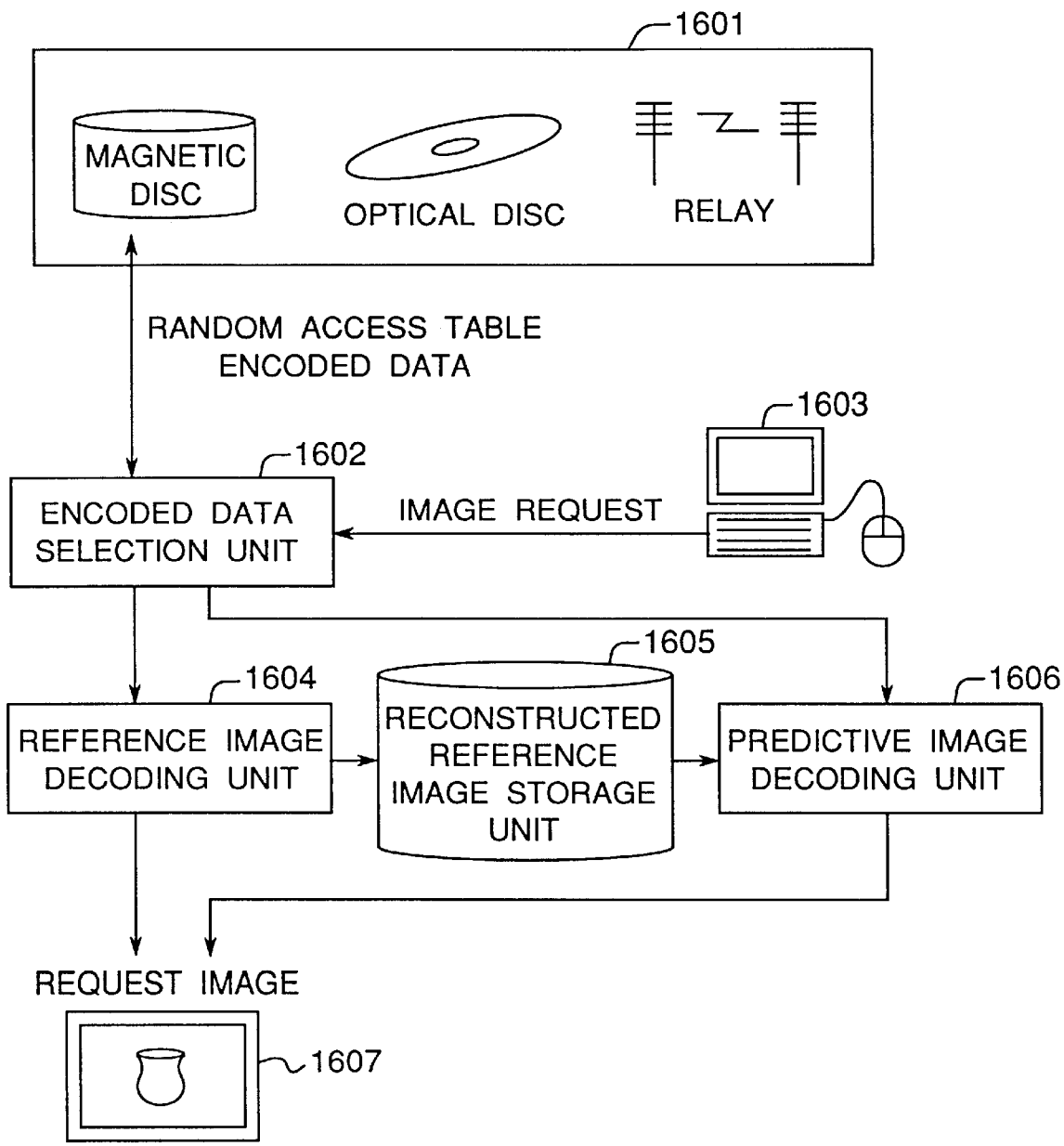
FIG. 16 is a block diagram of the image decoding device to which the fifth embodiment of the present invention pertains.

FIG. 16 is a block diagram of the image decoding device to which the fifth embodiment of the present invention pertains, and will be used to explain the configuration of the present embodiment.

In the drawing, a data record/relay unit (1601) stores/relays random access tables and encoded data, and outputs them to an encoded data selection unit (1602). An image request unit (1603) outputs the camera positions of requested images to the encoded data selection unit (1602).

Prompted by an image request, the encoded data selection unit (1602) searches the random access table to locate the necessary data, which it acquires from among the encoded data and outputs to the reference image decoding unit (1604) and predictive image decoding unit (1606). The reference image decoding unit (1604) decodes the reference image encoded, outputting it to a reconstructed reference image storage unit (1605), and if necessary to an image display unit (1607).

The reconstructed reference image storage unit (1605) stores reconstructed reference images, and outputs them to the predictive image decoding unit (1606). The predictive image decoding unit (1606) decodes the predictive image encoded data, and outputs reconstructed predictive images to the image display unit (1607). The image display unit (1607) displays the input images.

There follows a description of the action of the image decoding device to which the present embodiment pertains and which is configured in the above manner. The data record/relay unit (1601) stores/relays random access tables and encoded data, and outputs the random access tables to the encoded data selection unit (1602). It also outputs the encoded data to the encoded data selection unit (1602) in response to requests from that unit.

When the user operates a mouse connected to the computer and designates a viewpoint position which he wishes to see, the image request unit (1603) outputs the camera position corresponding to that viewpoint position to the encoded data selection unit (1602). The encoded data selection unit (1602) is the same as the encoded data selection unit (1203).

The reference image decoding unit (1604) decodes the reference image encoded data in which the reference image has been encoded, and outputs it to the reconstructed reference image storage unit (1605). At the reference/predictive flag, reference images are output to the image display unit (1607) as reconstructed reference images. The reconstructed reference image storage unit (1607) stores reconstructed reference images, and outputs them to the predictive image decoding unit (1606).

The predictive image decoding unit (1606) uses reconstructed reference images to decode the predictive image encoded data in which predictive images are encoded, and outputs reconstructed predictive images to the image display unit (1607). The image display unit (1607) displays the input images.

In the above manner, the present embodiment makes it possible to group and predictively encode, in an efficient manner, images which have been shot from a large number of different viewpoints with neighbouring camera positions, and by using a table which details reference relationships, encoded data positions and camera positions, effectively to search for, decode and display images from a desired camera position. Moreover, images which are requested consecutively frequently have neighbouring camera positions and belong to the same reference/predictive group, and by storing reconstructed reference images it is possible to effectively decode and display images by just decoding predictive encoded data.

Figure 17:
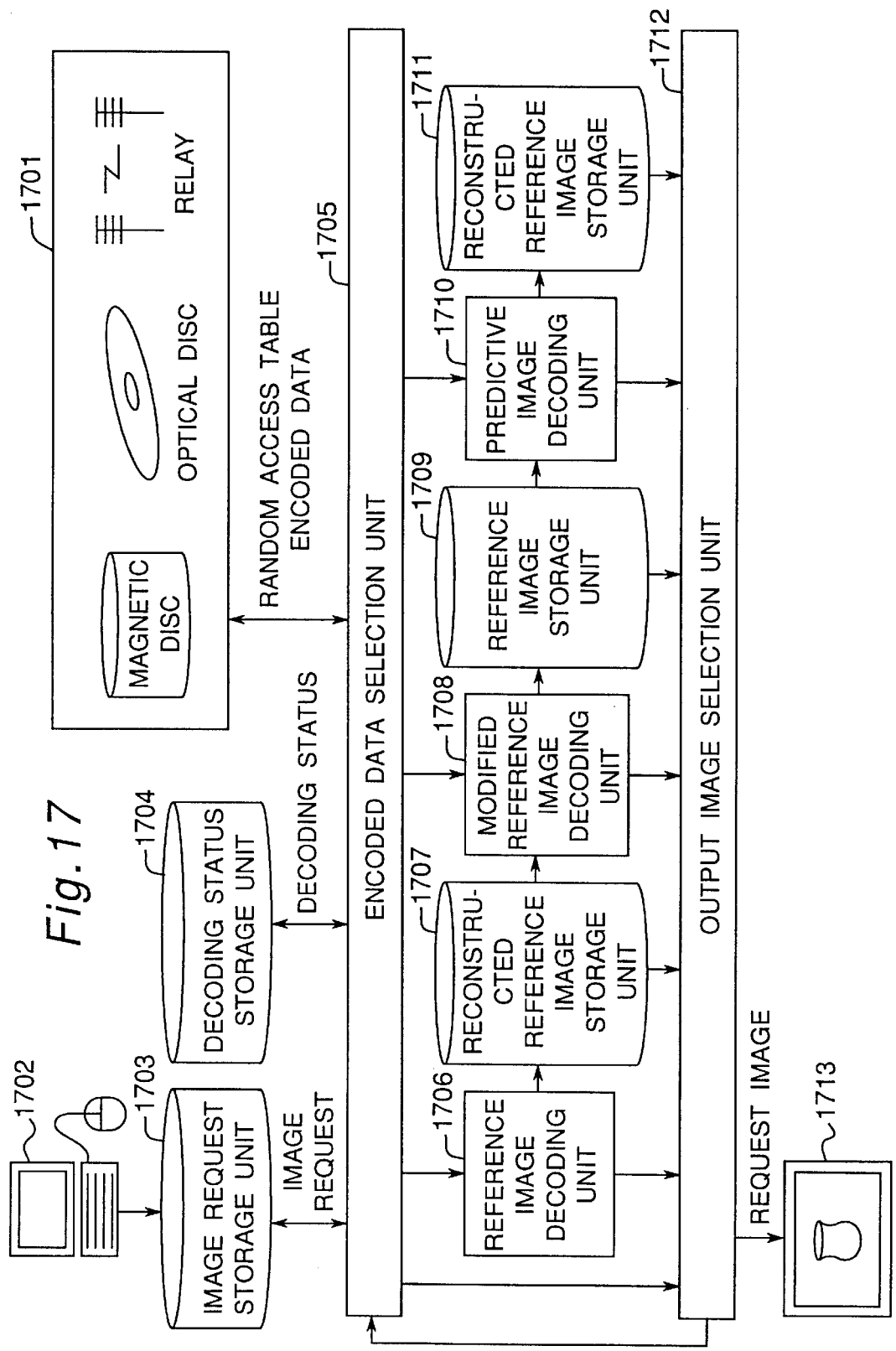
FIG. 17 is a block diagram of the image decoding device to which the sixth embodiment of the present invention pertains.

FIG. 17 is a block diagram-of the image decoding device to which the sixth embodiment of the present invention pertains, and will be used to explain the configuration of the present embodiment.

In the drawing, a data record/relay unit (1701) stores/relays random access tables and encoded data, and outputs them to an encoded data selection unit (1705). An image request monitoring unit (1702) monitors image requests and outputs them to an image request storage unit (1703).

The image request storage unit (1703) stores image requests. A decoding status storage unit (1704) stores the decoding status. An encoded data selection unit (1705) selects from the decoding status, image requests, random access table and encoded data the encoded data which is to be decoded, and outputs it to a reference image decoding unit (1706), modified reference image decoding unit (1708), predictive image decoding unit (1710) and output image selection unit (1712). The reference image decoding unit (1706) decodes reference image encoded data, and outputs reconstructed reference images to a reconstructed reference image storage unit (1707).

The reconstructed reference image storage unit (1707) stores reconstructed reference images. A modified reference image decoding unit (1708) decodes modified reference images from the movement vector section of encoded data and from reconstructed reference images, and outputs them to a modified reference image storage unit (1709).

The modified reference image storage unit (1709) stores modified reference images. A predictive image decoding unit (1710) decodes predictive images from the residual component section of encoded data and from modified reference images, and outputs them to a predictive image storage unit (1711). The predictive image storage unit (1711) stores predictive images. An output image selection unit (1712) selects images and outputs them to an image display unit (1713). The image display unit (1713) displays the images.

There follows a description of the action of the image decoding device to which the present embodiment pertains and which is configured in the above manner. The data record/relay unit (1701) stores/relays random access tables and encoded data, and outputs the random access tables to the encoded data selection unit (1705). The encoded data is read by the encoded data selection unit (1705).

The image request monitoring unit (1702) is a computer with a mouse. The requests which the user executes using the mouse are stored in the image request storage unit (1703). The image request storage unit (1703) stores the camera positions of the images which are requested, and they are read by the encoded data selection unit (1705).

The decoding status storage unit (1704) stores a decoding status table (1801). This is updated and read by the encoded data selection unit (1704). The camera positions on the decoding status table (1801) are (ρ, θ), and the decoding level shows the decoding status. The meaning of the decoding level is shown in a decoding level table (1802).

The encoded data selection unit (1705) determines from the requested camera positions, random access table and decoding status table the data which is to be output, the destination and the method of updating the decoding status table. FIG. 19 illustrates a status table showing examples of the status of requested camera positions, random access table and decoding status table. Here, P represents the camera position of a requested image, Q represents the camera position of a reference image required for decoding if the requested image is a predictive image, R represents the reference image camera position recorded on the decoding status table (1801), S represents the predictive image camera position recorded on the decoding status table (1801), and L represents the decoding level recorded on the decoding status table (1801).

Figure 20:
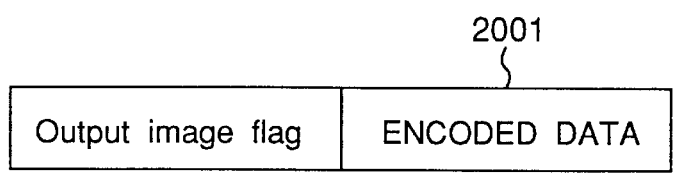
FIG. 20 is a diagram illustrating an output data table for the encoded data selection unit (1705)

FIG. 20 is a diagram illustrating an output data table (2002) showing the output data format (2001), output data vis-à-vis each status, destinations and updated decoding status table. In the output data format (2001), the output image flag represents the image which is ultimately to be output, 0 signifying no output, 1 output of a reconstructed reference image, 2 output of a modified reference image, and 3 output of a reconstructed predictive image. A search for encoded data positions corresponding to the camera positions is implemented from the random access table, and the results read by the data record/relay unit (1701).

The image request storage unit (1703) stores image requests. A decoding status storage unit (1704) stores the decoding status. An encoded data selection unit (1705) selects from the decoding status, image requests, random access table and encoded data the encoded data which is to be decoded, and outputs it to a reference image decoding unit (1706), modified reference image decoding unit (1708), predictive image decoding unit (1710) and output image selection unit (1712). The reference image decoding unit (1706) decodes reference image encoded data, and outputs reconstructed reference images to a reconstructed reference image storage unit (1707).

The reference image decoding unit (1706) outputs the output image flag to the output image selection unit (1712), while it decodes the encoded data into reference images and outputs them to the reconstructed reference image storage unit (1707). The reconstructed reference image storage unit (1707) stores the reconstructed reference images. The modified reference image decoding unit (1708) outputs the output image flag to the output image selection unit (1712), while it decodes the movement vector section of the encoded data, modifies the reconstructed reference images to create modified reference images, and outputs them to the reconstructed predictive image storage unit (1711). The reconstructed predictive image storage unit (1711) stores the reconstructed predictive images.

The predictive image decoding unit (1710) outputs the output image flag to the output image selection unit (1712), while it decodes the residual component section of the encoded data, adds the residual component section to the modified reference images, and outputs them to the reconstructed predictive image storage unit (1711). The reconstructed predictive image storage unit (1711) stores the reconstructed predictive images.

The output image selection unit (1712) outputs no output image flag if it is 0. If it is 1, it reads the reconstructed reference image from the reconstructed reference image storage unit (1706), and outputs it to the image display unit (1713). If it is 2, it reads the modified reference image from the modified reference image storage unit (1708), and outputs it to the image display unit (1713). If it is 3, it reads the reconstructed predictive image from the reconstructed predictive image storage unit (1711), and outputs it to the image display unit (1713). The image display unit (1713) displays the images.

In this manner, the present embodiment has a unit which monitors and stores image requests, and one which outputs modified images in the midst of the process of decoding. By automatically outputting a modified image or a reconstructed predictive image in response to the speed of changes in image requests and the speed of the process of image decoding, it is able to display modified images with poor picture quality when changes in image requests are rapid or when the process of image decoding is slow, and reconstructed predictive images when the opposite applies.

Figure 21:
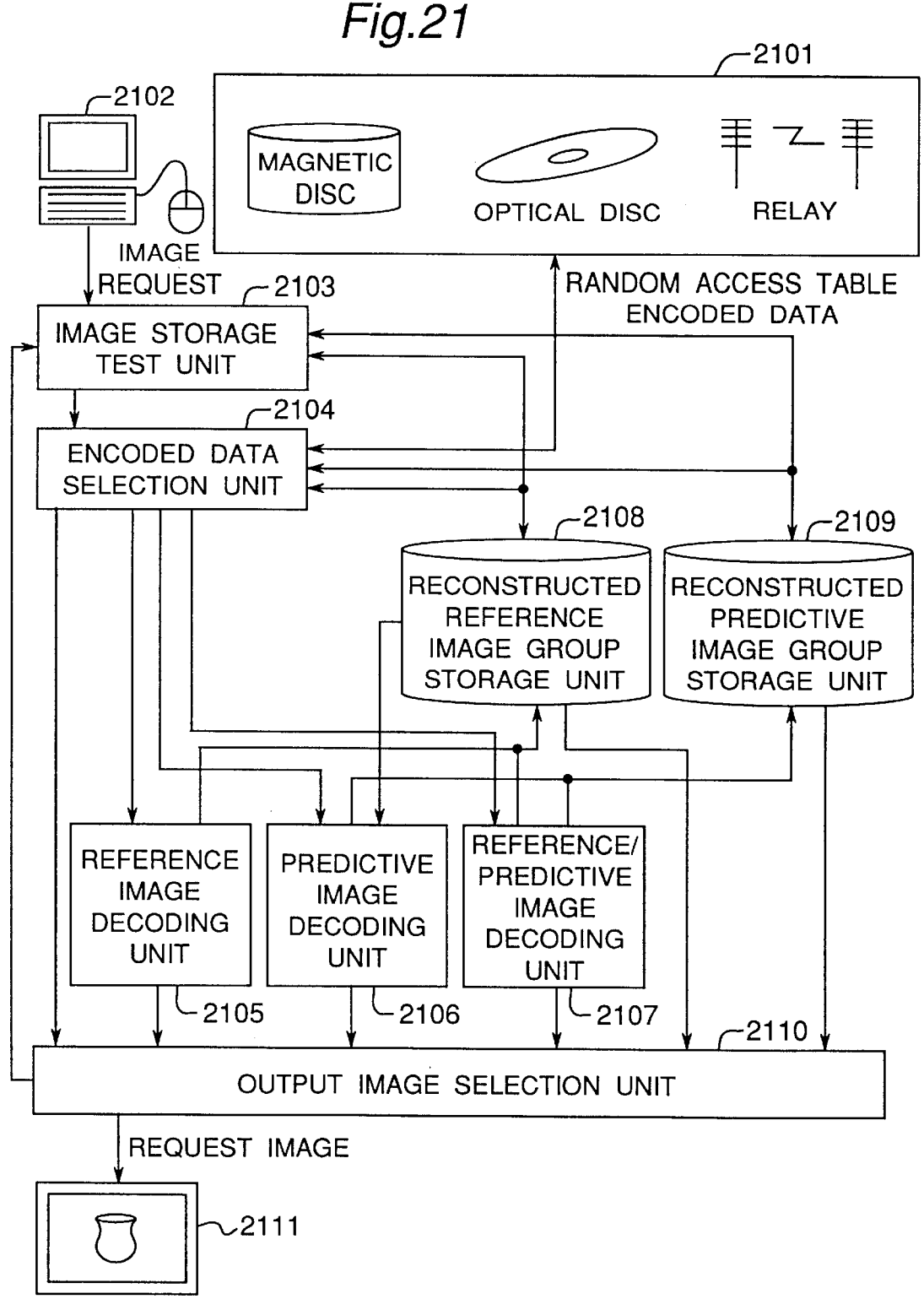
FIG. 21 is a block diagram of the image decoding device to which the seventh embodiment of the present invention pertains.

FIG. 21 is a block diagram of the image decoding device to which the seventh embodiment of the present invention pertains, and will be used to explain the configuration of the present embodiment.

In the drawing, a data record/relay unit (2101) stores/relays random access tables and encoded data, and outputs them to an encoded data selection unit (2104). An image request unit (2102) outputs the camera positions of requested images to an image storage test unit (2103). The image storage test unit (2103) calculates the importance of images stored in a reconstructed reference image group storage unit (2108) and a reconstructed predictive image group storage unit (2109) on the basis of camera positions, and erases those images which are of least importance in such a manner as not to exceed the maximum storage capacity. The encoded data selection unit (2104) selects the required encoded data on the basis of the stored images and random access tables, and outputs it to a reference image decoding unit (2105), predictive image decoding unit (2106) and reference/predictive image decoding unit (2107).

The reconstructed reference image group storage unit (2108) stores a plurality of reconstructed reference images and camera positions for each of them, outputting them to an output image selection unit (2110). The reconstructed predictive image group storage unit (2109) stores a plurality of reconstructed predictive images and camera positions for each of them, outputting them to the output image selection unit (2110). The reference image decoding unit (2105) decodes encoded data into reference images, and outputs them to the reconstructed reference image group storage unit (2108), while outputting camera positions for the requested images to the output image selection unit (2110). The predictive image decoding unit (2106) uses reconstructed reference images to decode encoded data into predictive images, and outputs them to the reconstructed predictive image group storage unit (2109), while outputting camera positions for the requested images to the output image selection unit (2110). The reference/predictive image decoding unit (2107) decodes encoded data into reference images and predictive images, outputting reconstructed reference images to the reconstructed reference image group storage unit (2108), and reconstructed predictive images to the reconstructed predictive image group storage unit (2109), while it outputs camera positions for the requested images to the output image selection unit (2110). The output image selection unit (2110) acquires images corresponding to the camera positions for the requested images from the reconstructed reference image group storage unit (2108) and reconstructed predictive image group storage unit (2109), and outputs them to the image display unit (2111). The image display unit (2111) displays the input images.

Provided next is a description of the action of the image decoding device to which the present embodiment pertains and which is configured in the above manner.

The data record/relay unit (2101) stores/relays random access tables and encoded data, and outputs the random access tables to the encoded data selection unit (2104). The encoded data is read by the encoded data selection unit (2104).

The image request unit (2102) is a computer with a mouse. The user employs to request images which he wishes to see, and the camera positions for the requested images are output to the image storage test unit (2103). The image storage test unit (2103) calculates the importance of each image in line with the camera positions of the requested images, the camera positions of the images stored in the reconstructed reference image group storage unit (2108), of which the maximum storage capacity is N images, and the camera positions of the images stored in the reconstructed predictive image group storage unit (2109), of which the maximum storage capacity is M images. It erases the image which is of N-th importance among those stored in the reconstructed reference image group storage unit (2108), and the image which is of M-th importance among those stored in the reconstructed predictive image group storage unit (2109). The importance of images is in direct proportion to the closeness of distance in the space $\rho-\theta$. Thus, if the camera position of a requested image is P, and the camera position of a stored image is Q, its importance W may be calculated as $$W = \frac{1}{d(P, Q)} \quad (8)$$

Now, if $$P_1=(\rho_1,\theta_1), P_2=(\rho_2,\theta_2) \quad (9)$$

then, $$d(P_1,P_2)=\min((\rho_1-\rho_2)^2,(\rho_1-\rho_2-360)^2, (\rho_1-\rho_2+360)^2)+(\theta_1-\theta_2)^2 \quad (10)$$

The encoded data selection unit (2104) compiles output data in correspondence to the status table shown in FIG. 22 and in line Pith the output data table shown in FIG. 23, outputting it to each of the destinations. In FIGS. 22 and 23, P is the camera position of the requested image, while Q is the camera position of the reference image which is required for decoding when the requested image is a predictive image. The output data is arranged in such a manner that output image camera position data comes at the head, followed by data which is required for reconstructing images.

The reference image decoding unit (2105) outputs the output image camera position data at the head of the input data to the output image selection unit (2110), while decoding the reference encoded data to reference images and outputting them to the reconstructed reference image group storage unit (2108).

The predictive image decoding unit (2106) outputs the output image camera position data at the head of the input data to the output image selection unit (2110), while using the reference encoded data to decode predictive image data to predictive images and outputting them to the reconstructed predictive image group storage unit (2109).

The reference/predictive image decoding unit (2107) outputs the output image camera position data at the head of the input data to the output image selection unit (2110). It decodes reference encoded data, and uses reconstructed reference images to decode predictive encoded data to predictive images, outputting reconstructed reference images to the reconstructed reference image group storage unit (2108), and reconstructed predictive images to the reconstructed predictive image group storage unit (2109).

The output image selection unit (2110) acquires images corresponding to output image camera position data from the reconstructed reference image group storage unit (2108) and reconstructed predictive image group storage unit (2109), and outputs them to the image display unit (2111).

The image display unit (2111) displays input images.

In this manner, the present embodiment utilises the fact that in a multi-viewpoint image decoding device the frequency of requests for images with camera positions in the vicinity of the image which is currently being requested is high. It therefore accords a high degree of importance to such images, and stores the most important of the images once they have been decoded, thus making it possible to decode images effectively.

Figure 24:
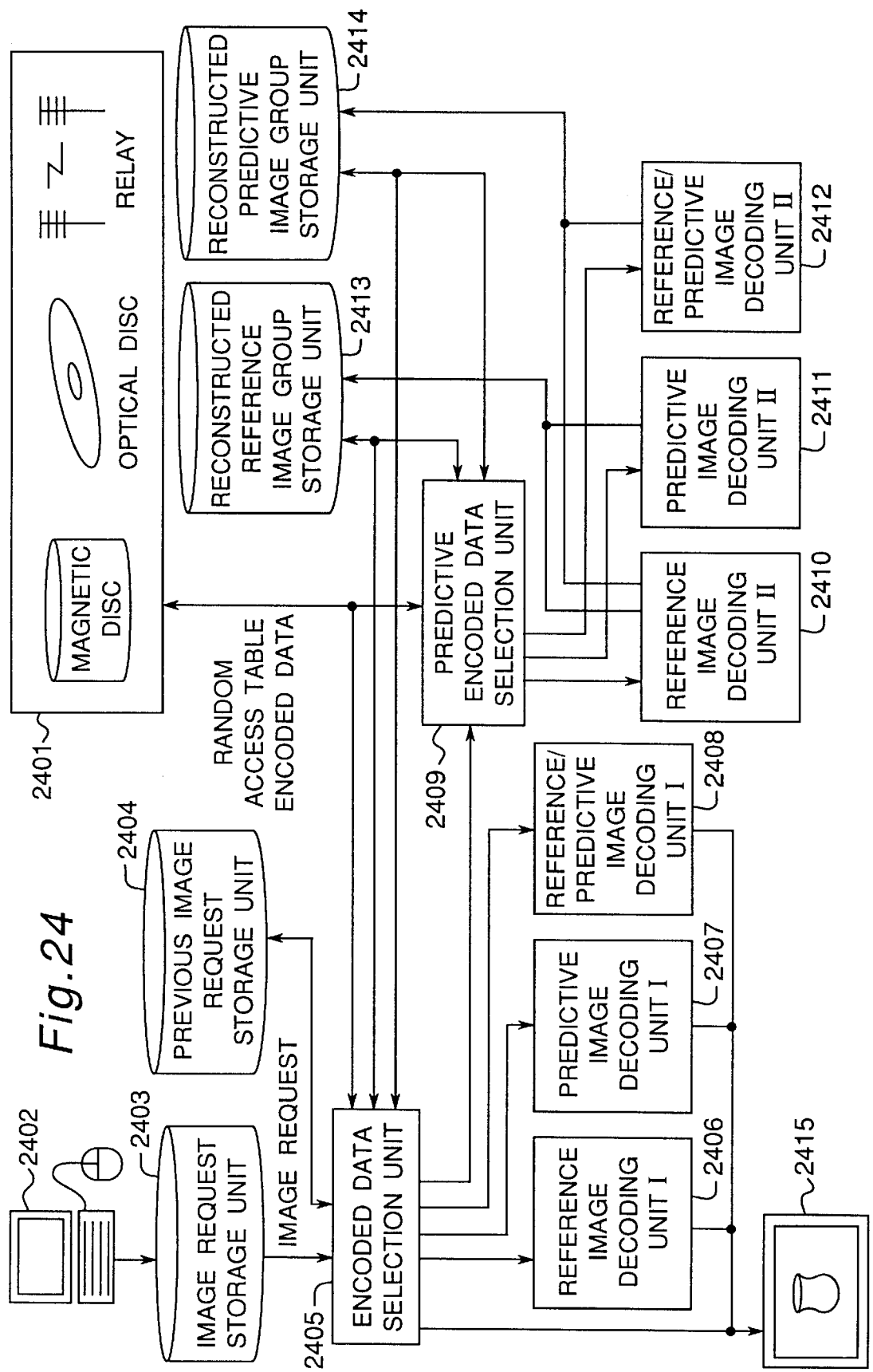
FIG. 24 is a block diagram of the image decoding device to which the eighth embodiment of the present invention pertains.

FIG. 24 is a block diagram of the image decoding device to which the eighth embodiment of the present invention pertains, and will be used to explain the configuration of the present embodiment.

In the drawing, a data record/relay unit (2401) stores/relays random access tables and encoded data, and outputs them to an encoded data selection unit (2405) and a predictive encoded data selection unit (2409). An image request monitoring unit (2402) outputs the camera positions of requested images to an image request storage unit (2403). The image request storage unit (2403) stores requested images, and they are read by the encoded data selection unit (2405). A previous image request storage unit (2404) stores the camera positions of the images which were processed last time. The previous image requests are read by the encoded data selection unit (2405) and updated.

The encoded data selection unit (2405) determines the encoded data which is to be decoded on the basis of the image requests which were processed last time and the status of storage of images. It selects the required encoded data and image data from the random access table and the encoded data, and outputs it to a reference/predictive image decoding unit 1 (2406), reference image decoding unit 1 (2407), predictive image decoding unit 1 (2408) and image display unit (2415).

The predictive encoded data selection unit (2409) predicts neighbouring camera positions which have not been decoded, selects the data which is required to decode the images in those positions from the random access table, encoded data and image data, and outputs it to a reference/predictive image decoding unit 2 (2410), reference image decoding unit 2 (2411) and predictive image decoding unit 2 (2412). The reference/predictive image decoding unit 1 (2406) decodes predictive images from the encoded data, and outputs them to the image display unit (2415).

The reference image decoding unit 1 (2407) decodes reference images from the encoded data, and outputs them to the image display unit (2415). The predictive image decoding unit 1 (2408) decodes predictive images from the encoded data and image data, and outputs them to the image display unit (2415). The reference/predictive image decoding unit 2 (2410) decodes reference images and predictive images from the encoded data, and outputs them to a reconstructed reference image group storage unit (2413) and reconstructed predictive image group storage unit (2414). The reference image decoding unit 2 (2411) decodes reference images from the encoded data, and outputs them to the reconstructed reference image group storage unit (2413). The predictive image decoding unit 2 (2412) decodes predictive images from the encoded data, and outputs them to the reconstructed predictive image group storage unit (2414).

There follows a description of the action of the image decoding device to which the present embodiment pertains and which is configured in the above manner.

The data record/relay unit (2401) stores/relays random access tables and encoded data, and outputs the random access tables to the encoded data selection unit (2405). The encoded data is read by the encoded data selection unit (2405). The image request unit (2402) is a computer with a mouse. The user employs the mouse to request images which he wishes to see, and the camera positions for the requested images are output to the image request storage unit (2403). The image request storage unit (2403) stores the requested images, and they are read by the encoded data selection unit (2405).

The previous image request storage unit (2404) stores the camera positions of the images which have been processed, and they are read by the encoded data selection unit (2405). The encoded data selection unit (2405) compiles output data in correspondence to the status table shown in FIG. 25 and in line with the output data table shown in FIG. 26, outputting it to each of the destinations. In FIGS. 25 and 26, P is the camera position of the requested image, while Q is the camera position of the reference image which is required for decoding when the requested image is a predictive image. R is the camera position of the image which was processed last time. If $R^1$ P, the images which are stored in the reconstructed reference image group storage unit (2413) and reconstructed predictive image group storage unit (2414) are erased, and P is read into the previous image request storage unit (2404).

The reference/predictive image decoding unit 1 (2406) decodes reference encoded data and predictive encoded data into predictive images and outputs them to the image display unit (2415). The reference image decoding unit 1 (2407) decodes reference encoded data into reference images and outputs them to the image display unit (2415). The predictive image decoding unit 1 (2408) decodes reference encoded data and predictive encoded data into predictive images and outputs them to the image display unit (2415).

The predictive encoded data selection unit (2409) searches the predictive table shown in FIG. 27 from the top in order to establish whether an image has been stored in the reconstructed reference image group storage unit (2413) or reconstructed predictive image group storage unit (2414). If it has not, it compiles output data in correspondence to the status table shown in FIG. 28 and in line with the output data table shown in FIG. 29, with its camera position as the predictive camera position S, and outputs it to each of the destinations. In FIGS. 28 and 29, T is the camera position of the reference image which is required for decoding when the image at the camera position S is a predictive image.

The reference/predictive image decoding unit 2 (2410) decodes reference encoded data and predictive encoded data into reference images and predictive images, outputting reference images to the reconstructed reference image group storage unit (2413), and predictive images to the reconstructed predictive image group storage unit (2414). The reference image decoding unit 2 (2411) decodes reference encoded data into reference images and outputs them to the reconstructed reference image group storage unit (2413).

The predictive image decoding unit 2 (2412) decodes reference encoded data and predictive encoded data into predictive images and outputs them to the reconstructed predictive image group storage unit (2414). The image display unit (2415) displays the input images.

In this manner, the present embodiment utilises the fact that in a multi-viewpoint image decoding device the frequency of requests for images with camera positions in the vicinity of the image which is currently being requested is high. Therefore, when there is no change in image request, it decodes images which are close to the camera position of the requested image, thus making it possible to decode images effectively.

Figure 30:
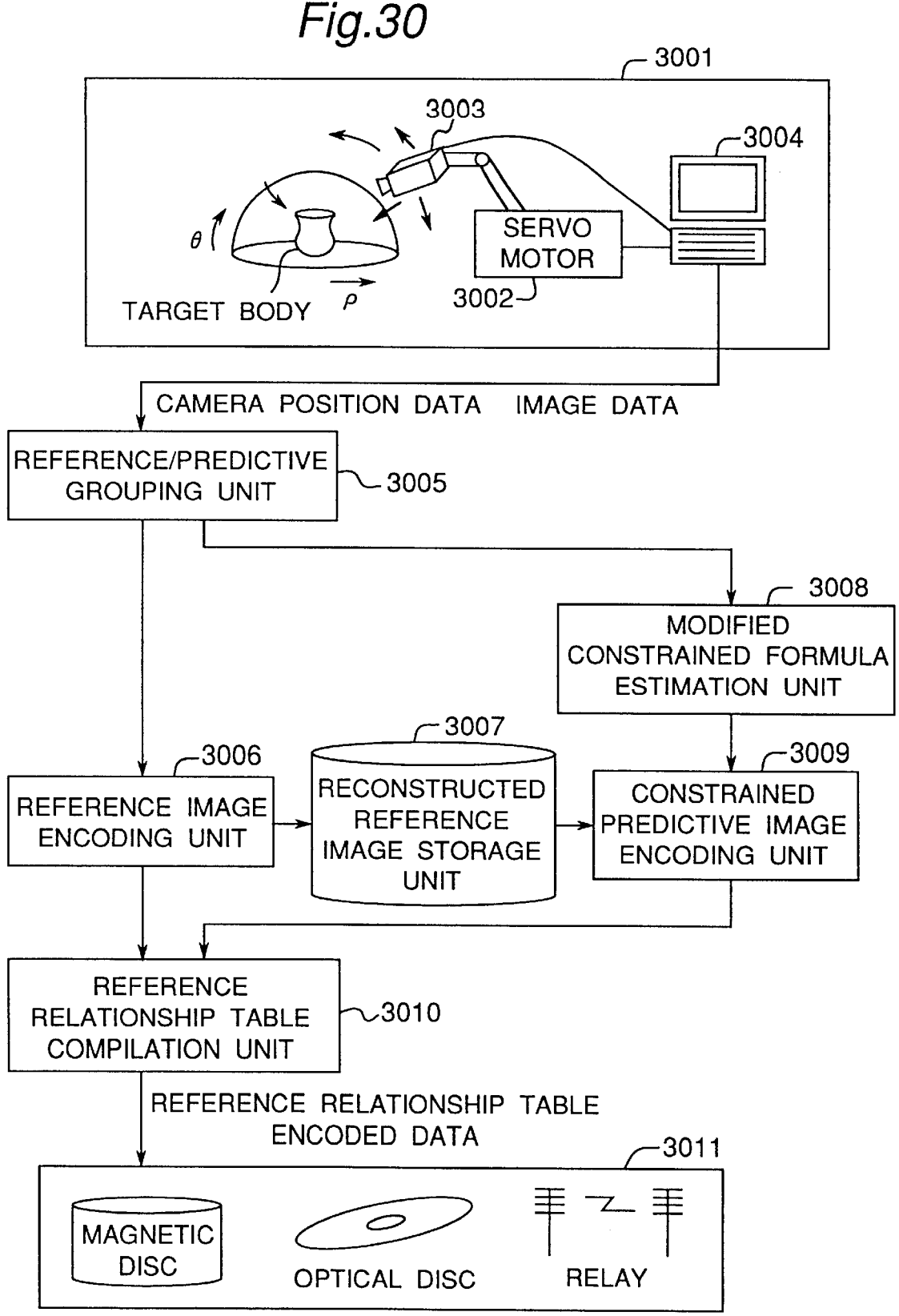
FIG. 30 is a block diagram of the image encoding device to which the eighth embodiment of the present invention pertains.

FIG. 30 is a block diagram of the image encoding device to which the ninth embodiment of the present invention pertains, and will be used to explain the configuration of the present embodiment.

In the drawing, a camera position control type image pickup device (3001) shoots an image of an object, outputting camera position data and image data on that object. A reference/predictive grouping unit (3005) groups the camera position data and image data into reference/predictive groups comprising reference images and at least one predictive image, and outputs the reference images to a reference image encoding unit (3006), while it outputs the camera position data, reference images and predictive images to a modified constraint formula estimation unit (3008).

The reference image encoding unit (3006) encodes the reference images, creates reconstructed reference images, outputting the encoded data to a reference relationship table compilation unit (3010), and the reconstructed reference images to a reconstructed reference image storage unit (3007). The reconstructed reference image storage unit (3007) stores the reconstructed reference images and outputs them to a constrained predictive image encoding unit (3009). The modified constraint formula estimation unit (3008) estimates constraint formulae and outputs them to the constrained predictive image encoding unit (3009).

The constrained predictive image encoding unit (3009) encodes the predictive images, and outputs the encoded data to the reference relationship table compilation unit (3010). From the encoded data, the reference relationship table compilation unit (3010) compiles a table detailing reference relationships, encoded data positions and camera positions, and outputs it to a data record/relay unit (3011). The data record/relay unit (3011) records and relays according to use.

Provided next is a description of the action of the image encoding device to which the present embodiment pertains and which is configured in the above manner. First, the camera position control type image pickup device (3001) shoots images from different viewpoints in such a manner as to cover the periphery of the object, in the same manner as with the camera position control type image pickup device illustrated in FIG. 1. It acquires camera position data and image data on that object, and outputs it in the format shown in FIG. 3.

The reference/predictive grouping unit (3005) groups the reference images and neighbouring images as predictive images in the same manner as the reference/predictive grouping unit (105) illustrated in FIG. 1, and outputs them to the reference image encoding unit (3006) and modified constraint formula estimation unit (3008) in the index order in the format shown in FIG. 5. The reference image encoding unit (3006) and the reconstructed reference image storage unit (3007) are the same as the reference image encoding unit (106) and reconstructed reference image storage unit (107) illustrated in FIG. 1.

The modified constraint formula estimation unit (3008) estimates the seven parameters of a constraint formula known as an epipolar constraint (Gang Xu and Zhengyou Zhang, *Epipolar Geometry in Stereo, Motion and Object Recognition: a unified approach*. Kluwer Academic Publishers, 1996).

Figure 31:
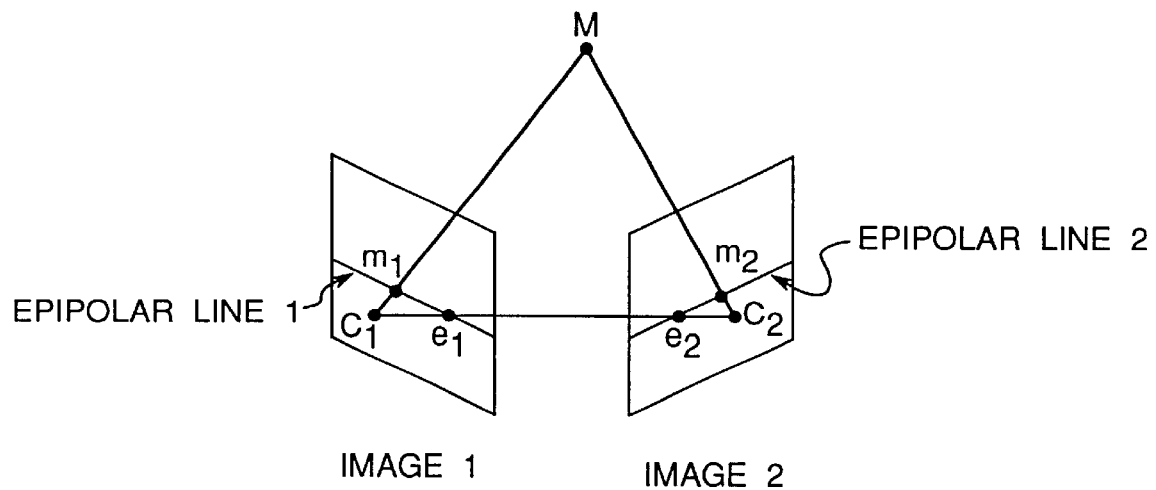
FIG. 31 is a diagram illustrating epipolar constraints.

FIG. 31 is a diagram illustrating epipolar constraints, where a point M within a three-dimensional space has been shot from different viewpoints. C1, C2 represent the focal points of the cameras which shot image 1 and image 2, respectively. M is projected on m1 in image 1, and m2 in image 2. C2 is projected on e1 in image 1, and C1 on e2 in image 2. e1 and e2 are referred to as epipoles on each image. A straight line projecting on to image 2 a straight line which passes through C1 and m1 within the three-dimensional space is referred to as an epipolar line, and is illustrated as epipolar line 2 in FIG. 31.

The epipolar line 2 can be determined by virtue of the internal parameters (focal distance, optical axis) and viewpoint position of the camera which shot image 1, the internal parameters and viewpoint position of the camera which shot image 2, and the coordinates of points on image 1. If it is possible to determine the epipolar line 2, the position of point m2 on image 2 which corresponds in the three-dimensional space to the point m1 on image 1 can be constrained even if the distance M from C1 is not obtained.

Figure 32:
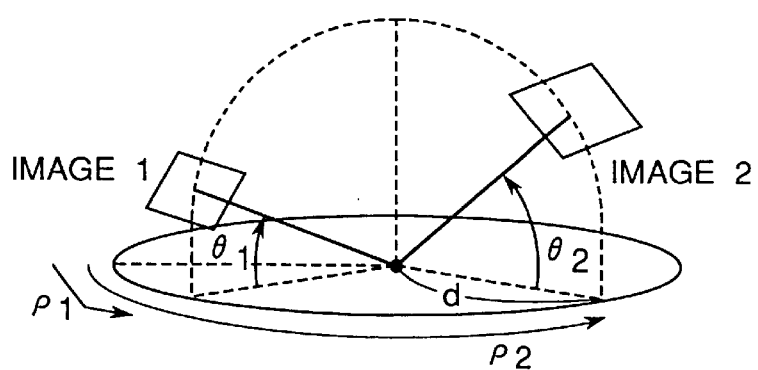
FIG. 32 is a diagram illustrating two different camera positions.

In image 1 and image 2, which have been shot from two points as illustrated in FIG. 32, the epipolar line on image 2 which corresponds to points (x1, y1) on image 1 may be represented in the following manner.

$$(x_1, y_1, 1) F (x_1, y_1, 1)^T = 0 \tag{11}$$

Here, $$F = A^{-T} t_x R A^{-1} \tag{12}$$

$$A = \begin{pmatrix} f & 0 & ox \\ 0 & f & oy \\ 0 & 0 & 1 \end{pmatrix} \tag{13}$$

$$R = \begin{pmatrix} 1 & 0 & 0 \\ 0 & \cos(\rho_2 - \rho_1) & -\sin(\rho_2 - \rho_1) \\ 0 & \sin(\rho_2 - \rho_1) & \cos(\rho_2 - \rho_1) \end{pmatrix} \tag{14}$$

$$\begin{pmatrix} \cos\theta_2 & 0 & -\sin\theta_2 \\ 0 & 1 & 0 \\ \sin\theta_2 & 0 & \cos\theta_2 \end{pmatrix} \begin{pmatrix} \cos\theta_1 & 0 & \sin\theta_1 \\ 0 & 1 & 0 \\ -\sin\theta_1 & 0 & \cos\theta_1 \end{pmatrix}$$

$$t = R(0, 0, -d)^T + (0, 0, d)^T \tag{15}$$

while ox, oy represent coordinates of the optical axis of the camera on the image, and f represents the focal distance.

(ρ1, θ1), (ρ2, θ2), d represent camera positions shown in FIG. 32, while X represents the calculation $$\begin{pmatrix} x_1 \\ x_2 \\ x_3 \end{pmatrix}_x = \begin{pmatrix} 0 & -x_3 & x_2 \\ x_3 & 0 & -x_1 \\ -x_2 & x_1 & 0 \end{pmatrix} \tag{16}$$

The internal camera parameters ox, oy, f are determined in advance, and (ρ1, θ1), (ρ2, θ2), d are yielded by the system. If $$F = \begin{pmatrix} f_{11} & f_{12} & f_{13} \\ f_{21} & f_{22} & f_{23} \\ f_{31} & f_{32} & f_{33} \end{pmatrix} \quad (17)$$

the parameter C may be calculated as $$e = \begin{pmatrix} \frac{f_{32}f_{21} - f_{22}f_{31}}{f_{22}f_{11} - f_{21}f_{12}} \\ \frac{f_{31}f_{12} - f_{11}f_{32}}{f_{22}f_{11} - f_{21}f_{12}} \\ \frac{f_{23}f_{12} - f_{22}f_{13}}{f_{22}f_{11} - f_{21}f_{12}} \\ \frac{f_{13}f_{21} - f_{11}f_{23}}{f_{22}f_{11} - f_{21}f_{12}} \\ \frac{-f_{12}}{f_{21}} \\ \frac{f_{11}}{f_{21}} \\ \frac{-f_{22}}{f_{21}} \end{pmatrix} \quad (18)$$

Figure 33:
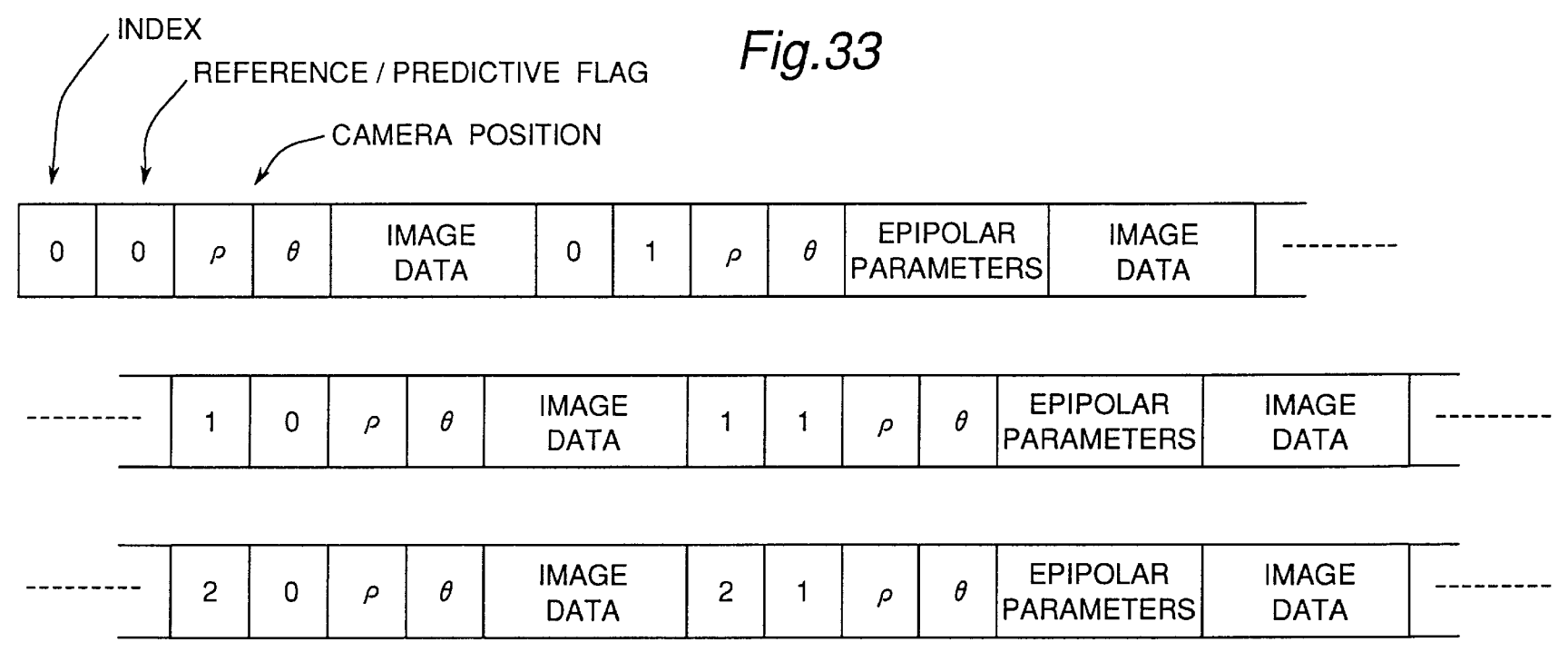

Taking the camera positions of the predictive images as ($\rho 1$, $\theta 1$) and using them as the camera positions ($\rho 2$, $\theta 2$) of the reference images for predicting those predictive images, epipolar parameters are estimated for each reference/predictive group. The epipolar parameters are added to the predictive images of the FIG. 5 data which forms the input, and output to the constrained predictive image encoding unit (3009) in the format illustrated in FIG. 33.

Figure 34:
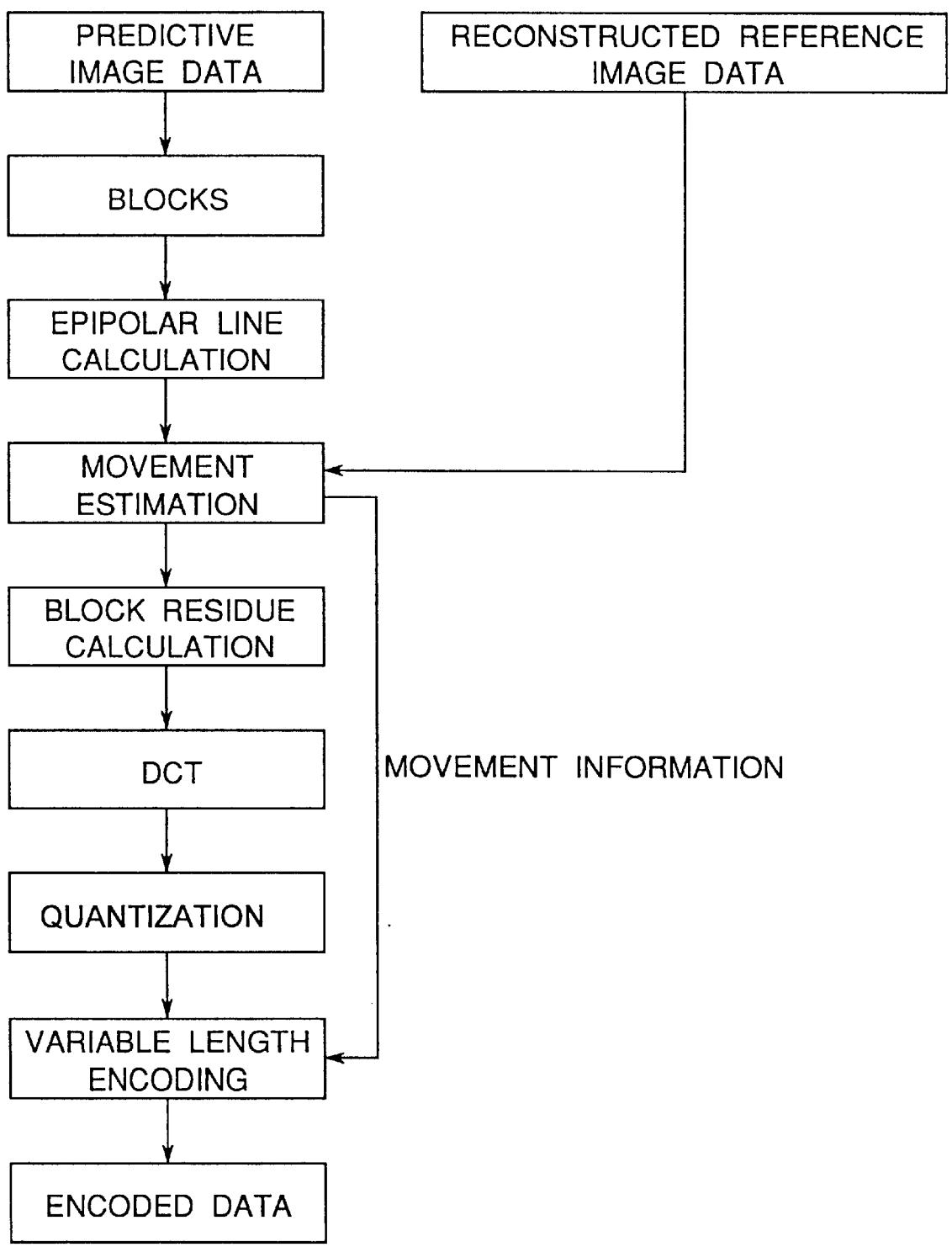
FIG. 34 is a flowchart illustrating a constrained predictive encoding unit.

FIG. 34 is a flowchart illustrating the constrained predictive encoding unit (3009). In the step labelled 'blocks', the predictive image data is divided into blocks.

In the step labelled 'epipolar line calculation', F is calculated as shown below from the epipolar parameter e estimated by the modified constraint formula estimation unit (3008) with the coordinates of the center point of each block as (x1, y1), and Formula 11 is used to determined the epipolar line for the block.

$$F = \begin{pmatrix} b & a & -(ay_b + bx_b) \\ -1 & -c & (cy_b + bx_b) \\ y_a - bx_a & cy_a - ax_a & -(cy_b - x_b)y_a + (ay_b + bx_b)x_a \end{pmatrix} \quad (19)$$

Here, $$e = \begin{pmatrix} x_a \\ y_a \\ x_b \\ y_b \\ a \\ b \\ c \end{pmatrix} \quad (20)$$

Figure 35:
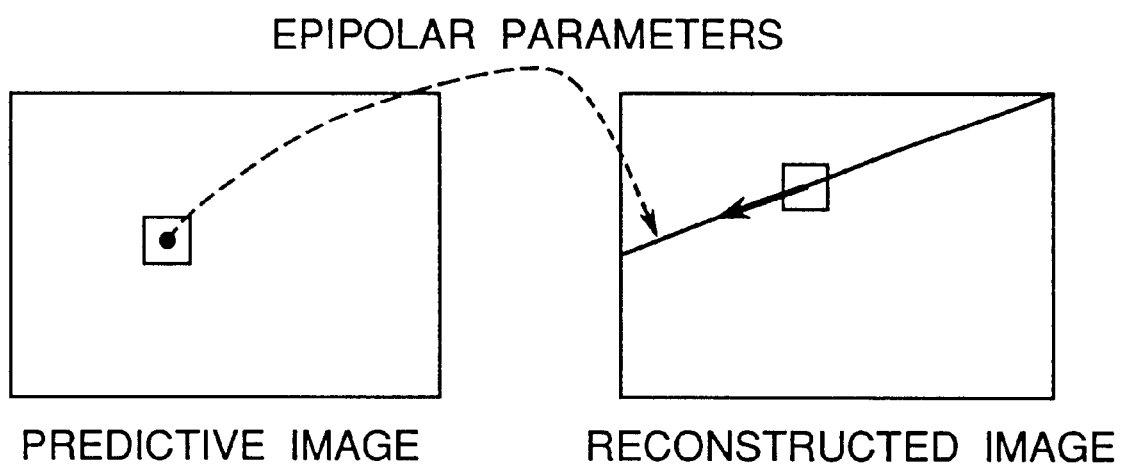
FIG. 35 is a diagram illustrating a method of predicting constrained movement.

In the step labelled 'movement estimation', as FIG. 35 shows, a block of predictive images is moved one-dimensionally along the epipolar line over reconstructed reference images in order to determine the amount of movement required for the sum of the absolute values of the differences in pixel value between the block of predictive images and the reference images to be minimised.

In the step labelled 'block residue calculation', the difference in pixel values is calculated in the position where the sum of the absolute values of the differences in pixel value between the block of predictive images and the reference images is minimised. In the step labelled 'DCT', digital cosine transformation is performed on the block residue as calculated in the step labelled 'block residue calculation'. In the step labelled 'quantisation', the results of the step labelled 'DCT' are quantised in the prescribed manner.

Figure 36:
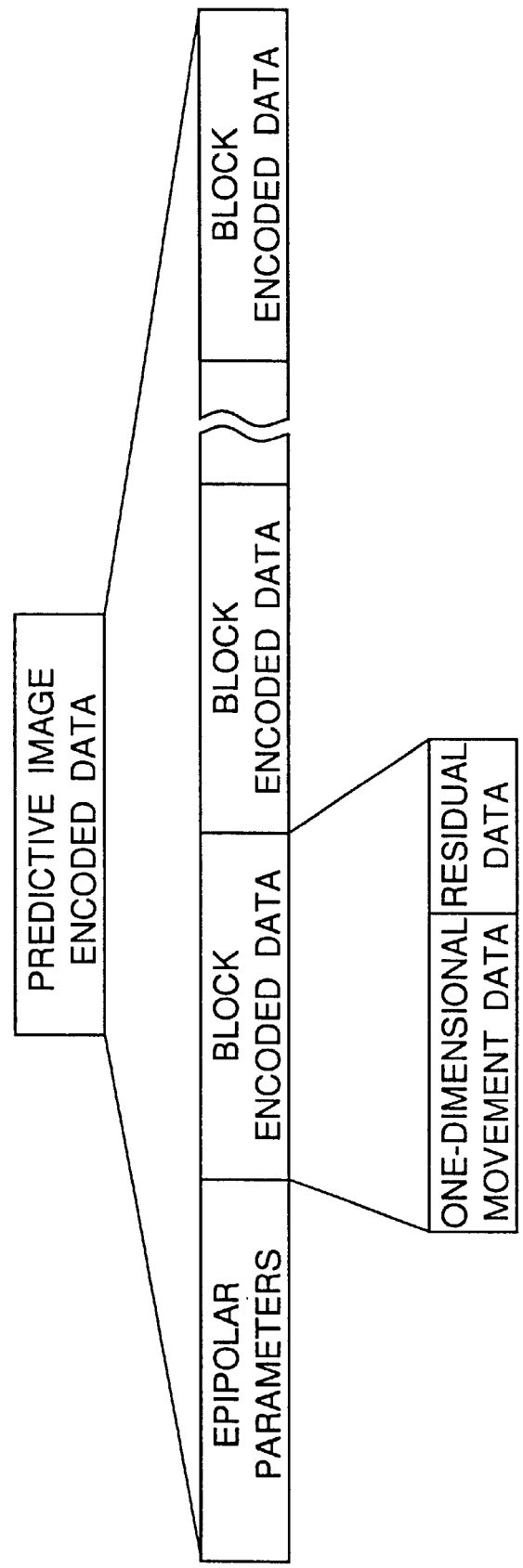
FIG. 36 is a diagram illustrating constrained predictive encoded data.

In the step labelled 'variable length encoding', the amount of one-dimensional movement calculated in the step labelled 'movement estimation' and the results of the step labelled 'quantisation' are converted into variable length encoding and output as encoding data in the format illustrated in FIG. 36.

The reference relationship table compilation unit (3010) and the data record/relay unit (3011) are the same as the reference relationship table compilation unit (109) and the data record/relay unit (110).

In this manner, the present embodiment utilises the fact that where as in a multi-viewpoint image a scene without movement is shot from a given viewpoint, the point of correspondence between two images does not depend on the object which has been shot, but is constrained on a straight line which can be determined from the viewpoint and internal parameters of the camera. It is therefore possible to encode images effectively by adding constraint parameters to the encoded data, while reducing two-dimensional movement information to one-dimensional.

Figure 37:
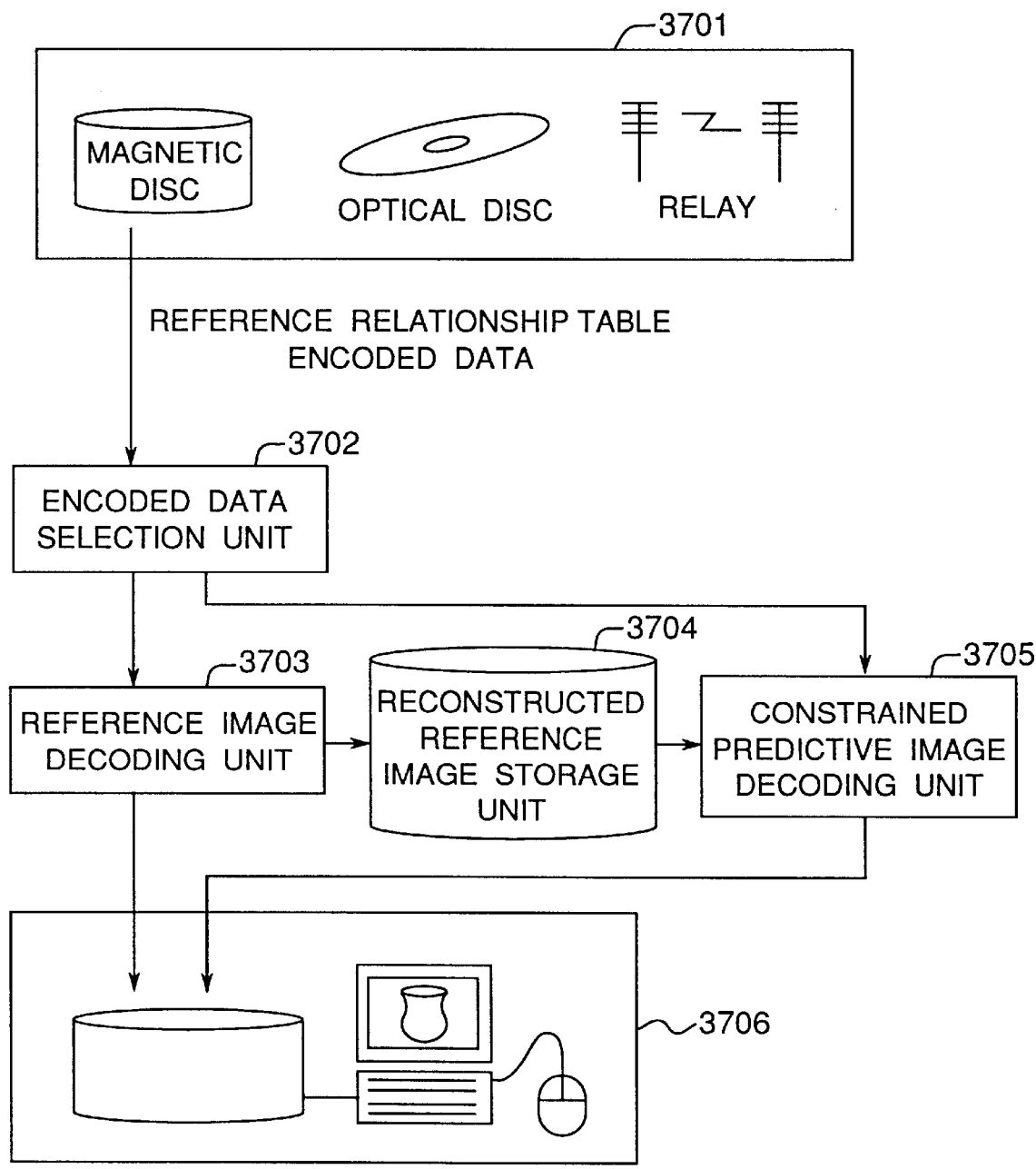
FIG. 37 is a block diagram of the image decoding device to which the ninth embodiment of the present invention pertains.

FIG. 37 is a block diagram of the image decoding device to which the tenth embodiment of the present invention pertains, and will be used to explain the configuration of the present embodiment.

In the drawing, a data record/relay unit (3701) stores/relays a reference relationship table and encoded data, and outputs them to an encoded data selection unit (3702). The encoded data selection unit (3702) searches for the position of the data from the reference relationship table, and outputs the required portion of the data to a reference image decoding unit (3703) and a constrained predictive image decoding unit (3705). The reference image decoding unit (1703) decodes the reference image encoded data and outputs reconstructed reference data images to a reconstructed reference image storage unit (3704), and if necessary to an image display unit (3706).

The constrained predictive image decoding unit (3705) stores the reconstructed reference data images, and outputs them to the constrained predictive image decoding unit (3705). The constrained predictive image decoding unit (3705) decodes the predictive image encoded data, and outputs reconstructed predictive data images to the image display unit (3706). The image display unit (3706) stores the input images and displays them in response to requests.

There follows a description of the action of the image decoding device to which the present embodiment pertains and which is configured in the above manner. The data record/relay unit (3701) stores/relays a reference relationship table and encoded data, and outputs them to an encoded data selection unit (3702). The encoded data selection unit (3702) searches for the position of the encoded data from the reference relationship table, and acquires encoded data for the encoded data position. It outputs a reference/predictive flag and the encoded data to the reference image decoding unit (3703). If there is any predictive encoded data, it outputs it to the predictive image decoding unit (3705).

However, if the reference encoded data which is output to the reference image decoding unit (3703) is the same as the previous, the action of outputting it to the reference image decoding unit (3703) is omitted because it has already been decoded and stored.

The reference image decoding unit (3703) decodes the reference encoded data in which the reference image has been encoded, outputting the reconstructed reference image to the reconstructed reference image storage unit (3704). At the reference/predictive flag, reference images are output to the image display unit (3706) as reconstructed reference images.

Figure 38:
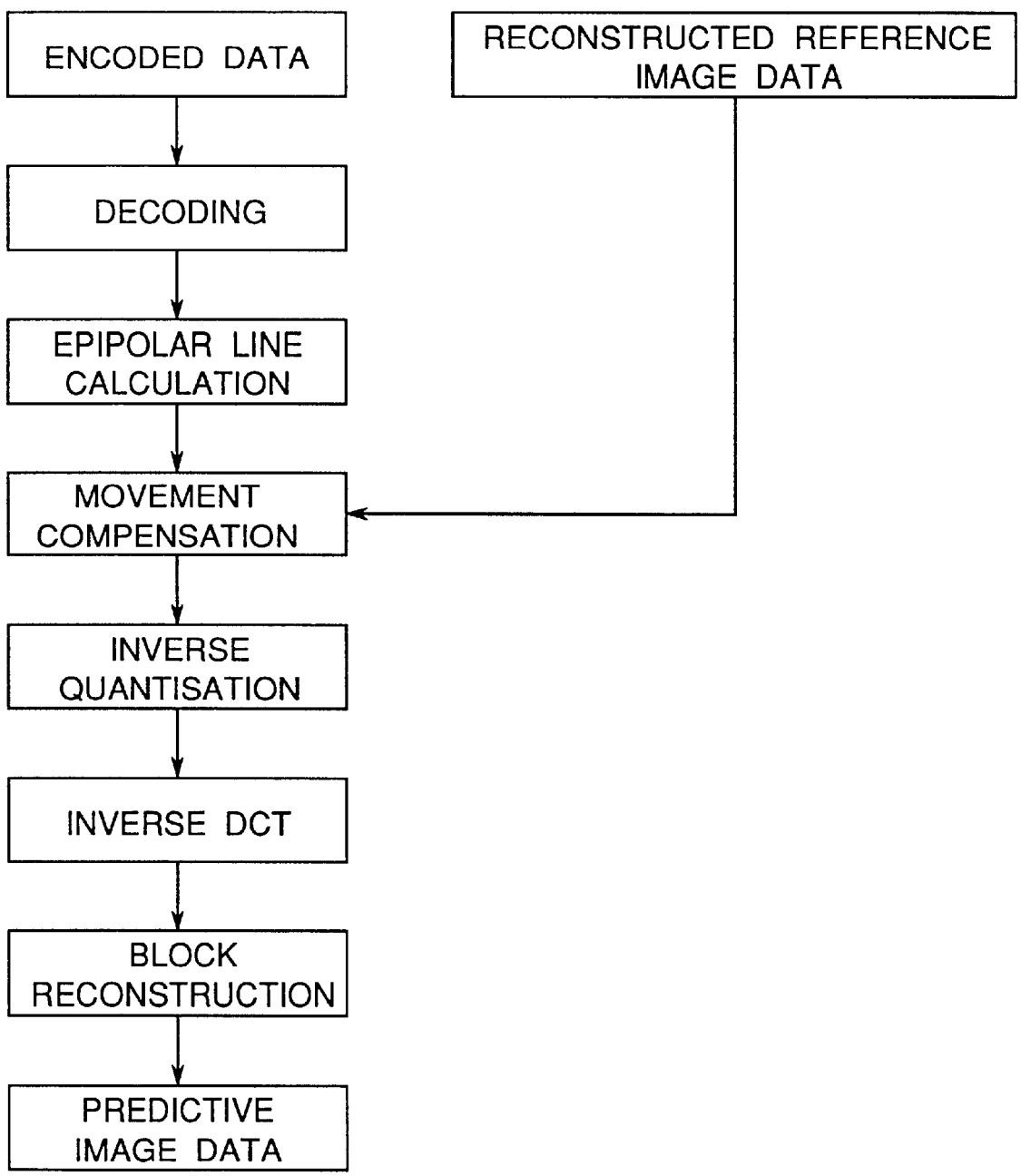
FIG. 38 is a flowchart illustrating a constrained predictive decoding unit.

The reconstructed reference image storage unit (3704) stores reconstructed reference images, and outputs them to the constrained predictive image decoding unit (3705). FIG. 38 is a flowchart illustrating the constrained predictive decoding unit (3705). In the step labelled 'decoding', the epipolar parameters, movement information and residual information are decoded.

In the step labelled 'epipolar line calculation', the epipolar line is calculated as in FIG. 34 from the center coordinates of the blocks and the epipolar parameter. In the step labelled 'movement compensation', a block is obtained by moving the decoded amount along the epipolar line, and a modified image constructed In the step labelled 'inverse quantisation', the residual information is subjected to inverse quantisation. In the step labelled 'inverse DCT', the residual information, which has been subjected to inverse quantisation, is now subjected to inverse DCT in order to obtain residual information on the pixels. In the step labelled 'block reconstruction', predictive image data is reconstructed by adding the residual information obtained in the step labelled 'inverse DCT' to the modified image obtained in the step labelled 'movement compensation'.

Thus, the predictive encoded data is decoded using reconstructed reference images, and output as reconstructed predictive images to the image display unit (3706). The image display unit (3706) stores the decoded images and displays them in response to searching by a mouse connected to the computer.

In this manner, the present embodiment utilises the fact that where as in a multi-viewpoint image a scene without movement is shot from a given viewpoint, the point of correspondence between two images does not depend on the object which has been shot, but is constrained on a straight line which can be determined from the viewpoint and internal parameters of the camera. It is therefore possible to decode encoded images effectively by adding constraint parameters to the encoded data, while reducing two-dimensional movement information to one-dimensional.

Figure 39:
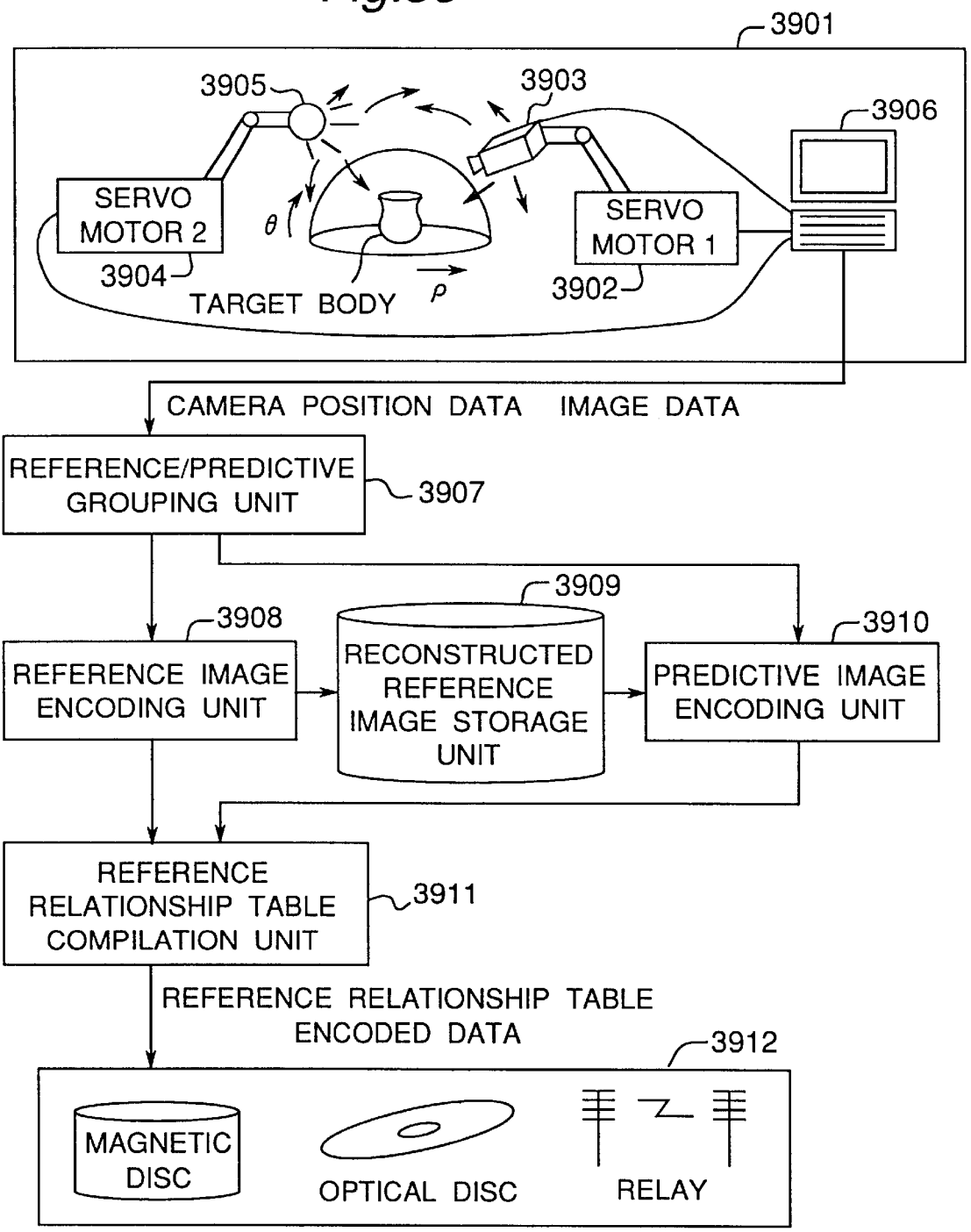
FIG. 39 is a block diagram of the image encoding device to which the tenth embodiment of the present invention pertains.

FIG. 39 is a block diagram of the image encoding device to which the eleventh embodiment of the present invention pertains, and will be used to explain the configuration of the present embodiment.

In the drawing, a camera position/light source position control type image pickup device shoots a images of objects and outputs camera position data, light source data and image data on them. A reference/predictive grouping unit groups the camera position data, light source data and image data into reference/predictive groups comprising reference images and at least one predictive image, outputting the reference images to a reference image encoding unit (3908), and the predictive images to a predictive image encoding unit (3908).

The reference image encoding unit (3908) encodes reference images and creates reconstructed reference images, outputting the encoded data to a reference relationship table compilation unit (3911), and the reconstructed reference images to a reconstructed reference image storage unit (3909). The reconstructed reference image storage unit (3909) stores the reconstructed reference images, and outputs them to a predictive image encoding unit (3910).

The predictive image encoding unit (3910) encodes the predictive images, and outputs the encoded data to the reference relationship table compilation unit (3911). From the encoded data the reference relationship table compilation unit (3911) compiles a table detailing reference relationships, encoded data positions, camera positions and light source positions, and outputs it to a data record/relay unit (3910). The data record/relay unit (3912) records and relays according to use.

Provided next is a description of the action of the image encoding device to which the present embodiment pertains and which is configured in the above manner. The camera position/light source position control type image pickup device (3901) shoots images with different light sources in such a manner as to cover the periphery of the object. The computer (3904) causes a servo motor 2 (3904) to move a light source (3905) to a position ρ1 degrees in the horizontal direction from the front of the object and θ1 degrees in the vertical direction from the horizontal plane. Further images are shot for each light source position in such a manner that the camera positions cover the periphery of the object.

The computer (3904) causes a servo motor 1 (3902) to move the camera (3903) to a position ρc degrees in the horizontal direction from the front of the object and θc degrees in the vertical direction from the horizontal plane, and acquires camera positions, light source positions and image data. The resultant image data comprises a brightness plane, color 1 plane, color 2 plane and alpha plane as in FIG. 2.

Here, ρ1, θ1, ρc, θc are $$0 \leq \rho_c < 360, 0 \leq \theta_c < 90 (\rho c, \theta c \text{ are integers}) \qquad (21)$$

and $$0 \leq \rho_1 < 360, 0 \leq \theta_1 < 90 (\rho 1, \theta 1 \text{ are multiple of 10}) \qquad (22)$$

Figure 40:
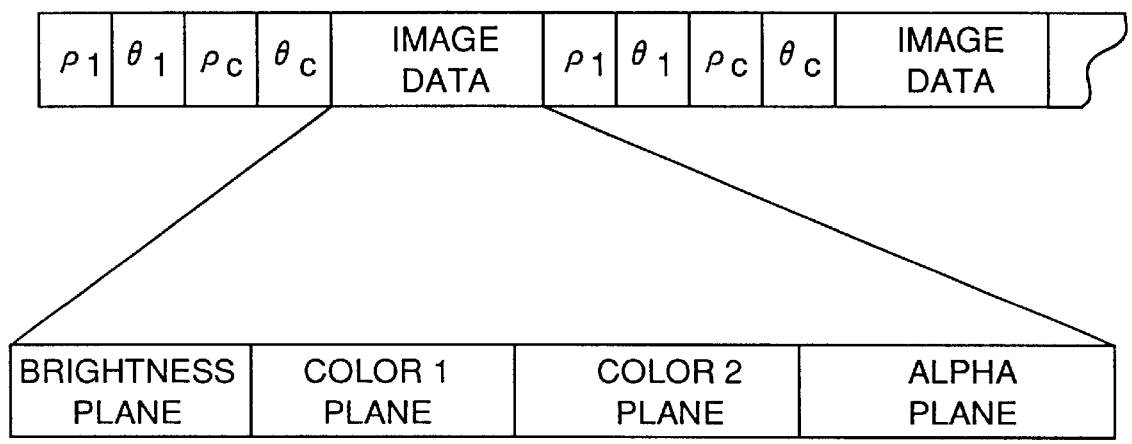
FIG. 40 is a diagram illustrating image data with added camera and light source positions.

Camera position, light source position and image data acquired in this manner are output in a format whereby the camera angle in the horizontal direction ρc, the camera angle in the vertical direction θc, the camera angle in the horizontal direction ρ1 and the camera angle in the vertical direction θ1 are added at the head of each piece of image data, as shown in FIG. 40.

In order for the reference/predictive grouping unit (3907) to encode predictively as predictive images those images which are approximated by reference images, it arranges reference images equidistantly in the space ρ1-θ1-ρc-θc, and groups images in the vicinity of reference images into predictive images predicted from those reference images. The processing which is performed by the reference/predictive grouping unit (3907) is the same as that performed by the reference/predictive grouping unit (105) in FIG. 1, except that it is four-dimensional. Grouped camera position, light source position and image data are output, reference images to the reference image encoding unit (3908) and predictive images to the predictive image encoding unit (3910) in the index order in the format shown in FIG. 41.

The reference image encoding unit (3908) encodes reference images in the same manner as the reference image encoding unit (106) illustrated in FIG. 1. The encoded data is output to the reference relationship table compilation unit (3911). Reconstructed reference images are created and output to the reconstructed reference image storage unit (3909).

Figure 41:
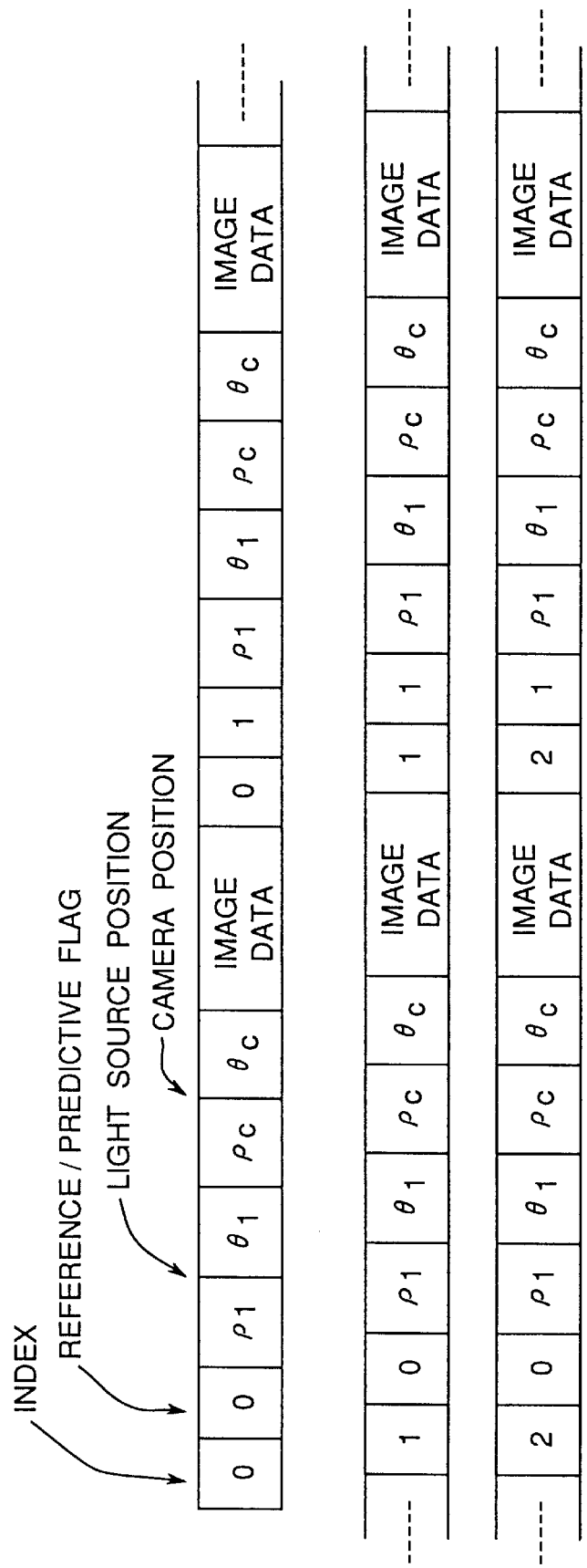
FIG. 41 is a diagram illustrating camera position data, light source position data and image data arranged by reference/predictive group.

The reconstructed reference image storage unit (3909) stores the reconstructed reference images, and outputs them to a predictive image encoding unit (3910). Although the reference images and predictive images are arranged in the reference/predictive grouping unit (3907) as shown in FIG. 41 prior to outputting, it is sufficient for the reconstructed reference image storage unit (3909) to have the capacity of one image.

Figure 42:
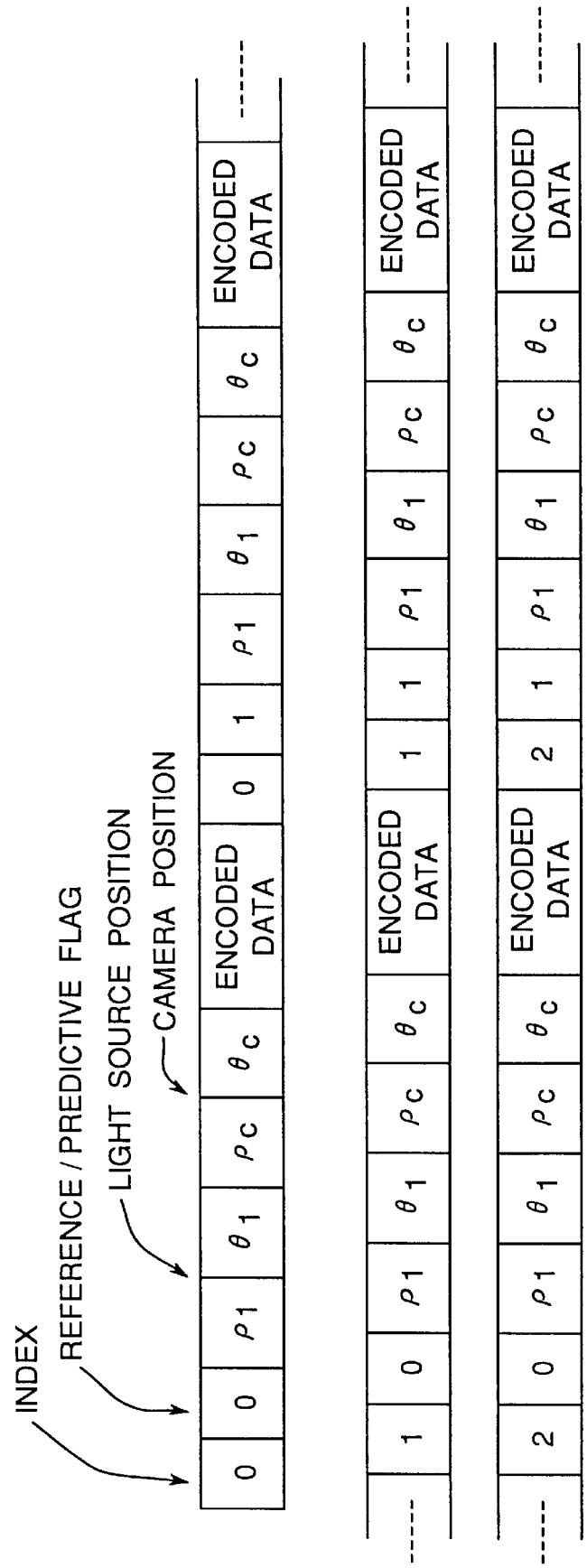
FIG. 42 is a diagram illustrating camera position date, light source position data and encoded data arranged by reference/predictive group.
Figure 43:
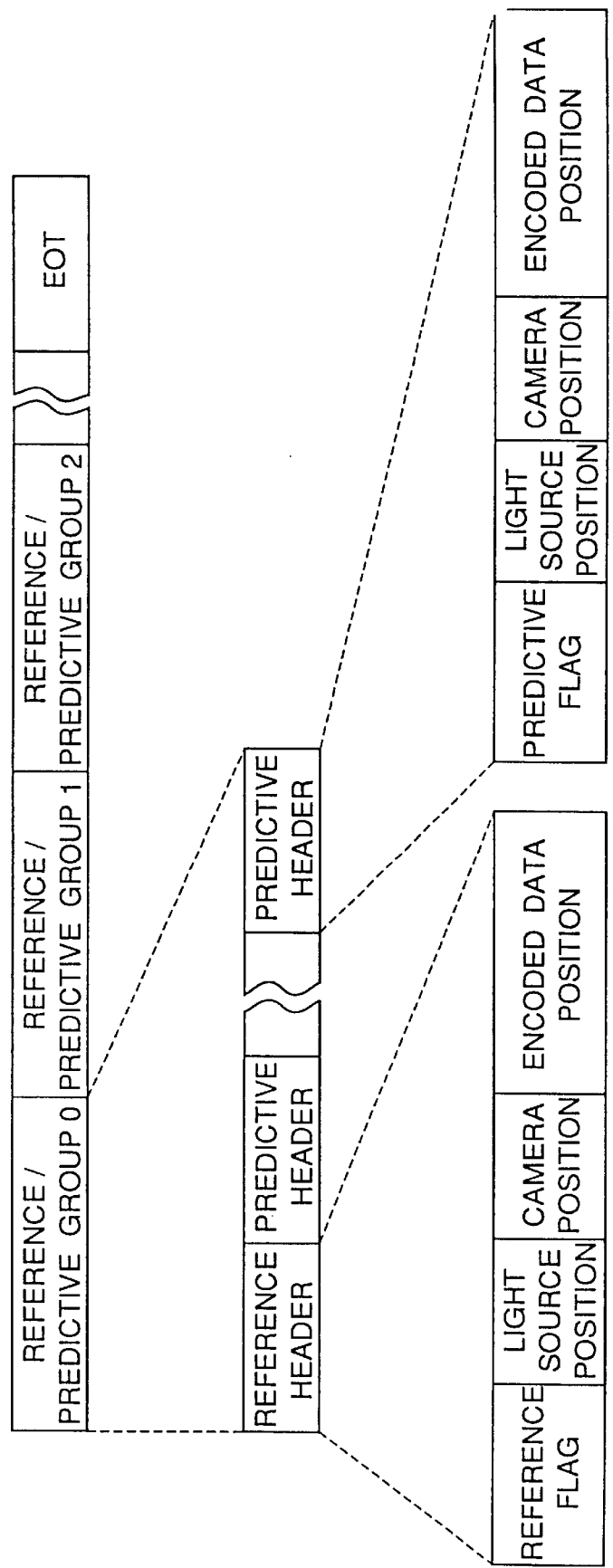
FIG. 43 is a diagram illustrating a reference relationship table output by the reference relationship table generating unit (3911)
Figure 44:
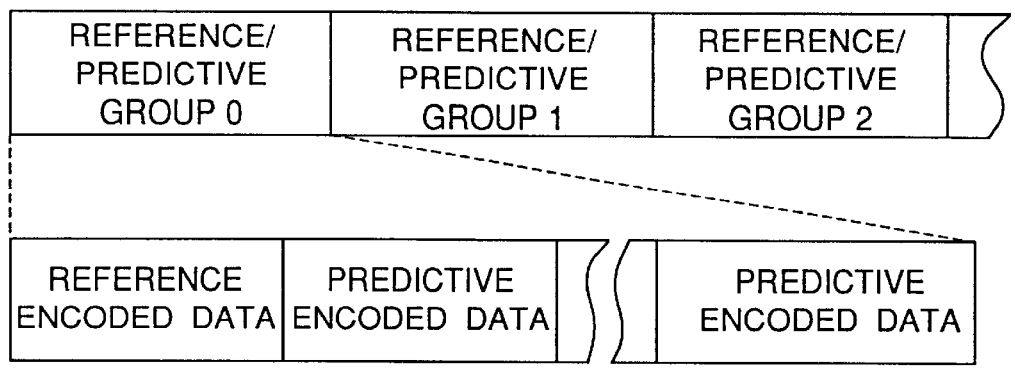
FIG. 44 is a diagram illustrating encoded data output by the reference relationship table generating unit (3911)

The predictive image encoding unit (3910) uses reconstructed reference images to encode the predictive images in the same manner as the predictive image encoding unit (108) illustrated in FIG. 1, and outputs the encoded data to the reference relationship table compilation unit (3911). The encoded data the reference relationship table compilation unit (3911) scans in order the data from each of the encoding units as shown in FIG. 42, compiles a reference relationship table and encoded data as shown in FIG. 44, and outputs it to a data record/relay unit (3912).

The data record/relay unit (3912) stores the reference relationship table and encoding data on a magnetic or optical disc, or relays them on a network or the like.

In this manner, the present embodiment makes it possible to group multi-viewpoint images shot from a large number of different viewpoints with a large number of different light source positions into reference images (neighbouring images with similar camera position data) and one or more predictive images, which permits effective encoding. Moreover, it arranges the images by reference/predictive group in such a manner that the reference images come at the head, before outputting them to the device for encoding, thus reducing the amount of calculation and the storage capacity required for calculation. Furthermore, by adding a table in which the encoded data positions are stored in the order in which they are arranged, it facilitates effective decoding which is consistent with random access.

Figure 45:
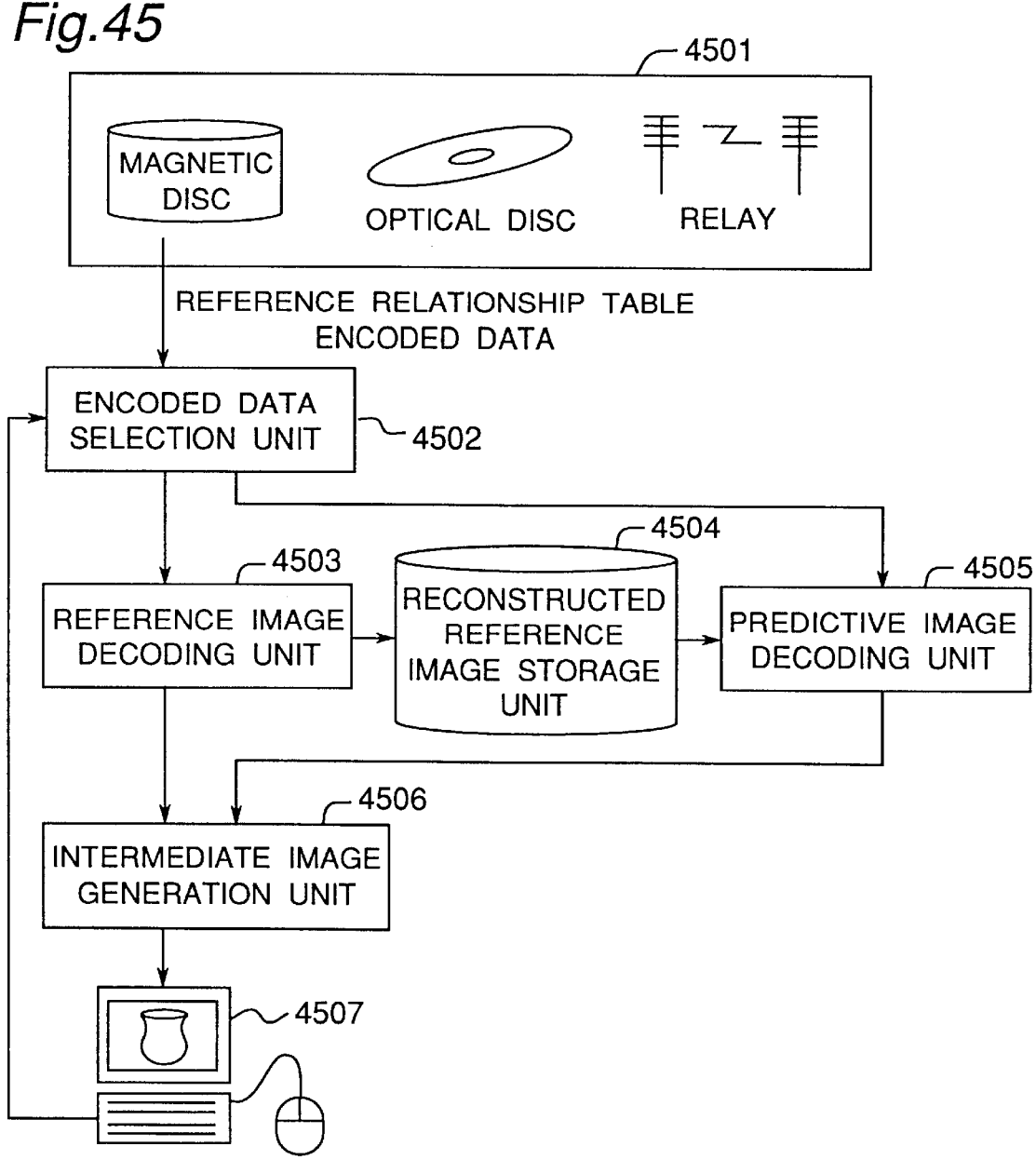
FIG. 45 is a block diagram of the image decoding device to which the tenth embodiment of the present invention pertains.

FIG. 45 is a block diagram of the image decoding device to which the twelfth embodiment of the present invention pertains, and will be used to explain the configuration of the present embodiment.

In the drawing, a data record/relay unit (4501) stores/relays a reference relationship table and encoded data, and outputs them to an encoded data selection unit (4502). The encoded data selection unit (4502) searches for the position of the data from the reference relationship table, and outputs the required portion of the data to a reference image decoding unit (4503) and a predictive image decoding unit (4505).

If there is no encoded data for the requested light source position, encoded data for a plurality of neighbouring light source positions is selected, and each is output to the reference image decoding unit (4503) or the predictive image decoding unit (4505). The reference image decoding unit (4503) decodes the reference image encoded data and outputs reconstructed reference data images to a reconstructed reference image storage unit (4504) and an intermediate image generation unit (4506). The reconstructed reference image storage unit (4505) stores the reconstructed reference data images, and outputs them to the predictive image decoding unit (4505). The predictive image decoding unit (4505) decodes the predictive image encoded data, and outputs reconstructed predictive data images to the intermediate image generation unit (4506).

If there is no encoded data for the requested light source position, the intermediate image generation unit (4506) uses images for neighbouring light source positions to generate an image with the requested light source position, and outputs it to an image display unit (4507). The image display unit (4507) stores the input images and displays them when requested.

There follows a description of the action of the image decoding device to which the present embodiment pertains and which is configured in the above manner.

The data record/relay unit (4501) stores/relays a reference relationship table and encoded data, and outputs them to an encoded data selection unit (4502).

The encoded data selection unit (4502) searches for the requested light source position and camera position from the reference relationship table, and acquires encoded data for the encoded data position from the data record/relay unit (4501). It outputs a reference/predictive flag and the encoded data to the reference image decoding unit (4503). If there is any predictive encoded data, it outputs it to the predictive image decoding unit (4505).

However, if the reference encoded data which is output to the reference image decoding unit (4503) is the same as the previous, the action of outputting it to the reference image decoding unit (4503) is omitted because it has already been decoded and stored. If there is no data for the requested light source position, it outputs the encoded data for the four neighbouring light source positions to the reference image decoding unit (4503) and predictive image decoding unit (4504), respectively.

If the requested image is (ρl, θl, ρc, θc) and the reference relationship table contains only images where the light source positions have angles in the vertical and horizontal directions which are multiples of 10, the four neighbouring encoded data (ρl1, θl1, ρc, θc), (ρl1, θl2, ρc, θc), (ρl1, θl1, ρc, θc), (ρl2, θl2, ρc, θc) are obtained by the following formulae.

$$\rho_{l1} = \lceil \rho l \rfloor \tag{23}$$

$$\rho_{l2} = \lceil \rho l \rfloor + 10 \tag{24}$$

$$\theta_{l1} = \lceil \theta_1 \rfloor \tag{25}$$

$$\theta_{l2} = \lceil \theta_1 \rfloor + 10 \tag{26}$$

Here, $\lceil \cdot \rfloor$ represents a multiple of 10 not in excess of Moreover, where ρl2 is 360, ρl2=0.

The reference image decoding unit (4503) decodes the reference image encoded data and outputs reconstructed reference data images to the reconstructed reference image storage unit (4504).

At the reference/predictive flag, reference images are output as reconstructed reference images to the intermediate image generation unit (4506). The reconstructed reference image storage unit (4504) stores the reconstructed reference data images, and outputs them to the predictive image decoding unit (4505).

The predictive image decoding unit (4505) uses reconstructed reference images to decode predictive encoded data in which predictive images are encoded, and outputs reconstructed predictive data images to the intermediate image generation unit (4506). If the requested light source position and the light source position for the decoded image data are equal, it outputs it to the image display unit (4506). If they are not equal, it generates an intermediate image from images with neighbouring light source positions selected by the encoded data selection unit (4502).

Suppose the light source position of the requested image is (ρl, θl, ρc, θc), and the light source positions of the images selected by the encoded data selection unit (4502) are (ρl1, θl1, ρc, θc), (ρl1, θl2, ρc, θc), (ρl2, θl1, ρc, θc), (ρl2, θl2, ρc, θc). If the neighbouring images are represented respectively as I1, I2, I3, I4, and the pixel values of the coordinated (x, y) of the image I1 as I1 (x, y), the pixel values I (x, y) of the intermediate image I are calculated by the following formula.

$$I(x,y) = r_3(r_1 I_1(x,y) + r_2 I_3(x,y)) + r_4(r_1 I_2(x,y) + r_2 I_4(x,y)) \tag{27}$$

Here, $$r_1 = \frac{\rho_{12} - \rho_I}{\rho_{12} - \rho_{II}} \tag{28}$$

$$r_2 = \frac{\rho_I - \rho_{II}}{\rho_{12} - \rho_{II}} \tag{29}$$

$$r_3 = \frac{\theta_{12} - \theta_I}{\theta_{12} - \theta_{II}} \tag{30}$$

$$r_3 = \frac{\theta_I - \theta_{II}}{\theta_{12} - \theta_{II}} \tag{31}$$

The generated intermediate image is output to the image display unit (4507)

The image display unit (4507) stores and displays the decoded image.

In this manner, the present embodiment makes it possible to group images shot from a large number of different viewpoints with a large number of different light source positions into images with neighbouring camera positions, and by utilising tables which detail reference relationships, encoded data positions and camera positions, effectively to decode predictive data whereby the groups have been encoded predictively.

Moreover, since entries in the reference relationship tables are by group order, and decoding is implemented consecutively within the same reference/predictive group, it is possible to store reconstructed reference images and to effectively decode and display images by just decoding predictive encoded data.

Furthermore, even where no images with the requested light source position have been encoded, it is possible to display the requested image by generating an image with the requested light source position from images with neighbouring light source positions.

[Effect of the Invention]

For the reasons listed below, the image encoding device and image decoding device to which the present invention pertains permit more effective encoding and decoding than is the case with conventional image encoding technology.

1. The addition to the image encoding data of tables detailing reference relationships, encoded data positions and camera positions permits the use of predictive encoding of a plurality of predictive images from reference images.

2. Reference to tables detailing reference relationships, encoded data positions and camera positions allows the encoded data position of a requested image to be searched for immediately, and decoding to be implemented.

3. Monitoring requests for image reproduction and referring to these makes it possible, in line with rapid changes in requests and with calculating capacity, to decode automatically in stages modified images where image quality is poor but the calculation load is small, and predictive images where image quality is good but the calculation load is large.

4. Calculating the camera positions of images which are to be stored and storing decoded images allows the frequency of decoding to be reduced.

5. Calculating the camera positions of images which are to be reproduced if there is no change in the images which are to be reproduced, and image camera positions where the camera position is to be decoded, and then decoding them in advance, permits rapid response to changes in images which are to be reproduced.

6. Utilising the fact that points of correspondence can be constrained in a direct line without reference to the object where there is no movement in a scene makes it possible to encode images effectively by constraint parameters and one-dimensional movement information.

7. Utilising the fact that points of correspondence can be constrained in a direct line without reference to the object where there is no movement in a scene makes it possible to decode encoded data in which images have been encoded effectively by constraint parameters and one-dimensional movement information.

8. The addition to the image encoding data of tables detailing reference relationships, encoded data positions and camera positions permits encoding of images of objects with a large number of lighting effects from a large number of viewpoints in a state in which they can be decoded effectively in response to requests.

9. Data which is encoded with the addition to the image encoding data of tables detailing reference relationships, encoded data positions and camera positions can be decoded effectively in response to requests. Moreover, where the encoded data does not contain an image for a requested light source position, an intermediate image can be generated from images with neighbouring light source positions.

What is claimed is:

1. A computer program embodied on a computer readable medium for use with a computer for image encoding, said computer program comprising:

computer readable program code means for causing the computer to input a plurality of images which are to be encoded and relevant camera position data into a reference/predictive grouping device;

computer readable program code means for causing the computer to group the plurality of images which are to be encoded into reference images and predictive images which are predictively encoded from the reference images, wherein a plurality of the predictive images reference the same reference image;

computer readable program code means for causing the computer to encode the reference images based on the reference/predictive relationship in each group;

computer readable program code means for causing the computer to encode the predictive images, by referencing the reconstructed reference images, based on the reference/predictive relationship in each group;

computer readable program code means for causing the computer to compile a reference relationship table detailing reference/predictive relationship of each image, encoded data positions, and camera positions based on the reference/predictive relationship in each group; and computer readable program code means for causing the computer to output the reference relationship table and the encoded data.

2. A computer program embodied on a computer readable medium for use with a computer for image decoding, said computer program comprising:

computer readable program code means for causing the computer to input requests for images which are to be reproduced, encoded data whereby the images have been encoded, and a reference relationship table detailing a coding dependency of each image, encoded data positions, and camera positions based on reference/predictive relationships into a selecting device;

computer readable program code means for causing the computer to select, from the reference relationship table, encoded data of the requested image and encoded data of the image referenced by the encoded data;

computer readable program code means for causing the computer to decode reference images whereby encoded data is decoded and reconstructed reference images are outputted; and computer readable program code means for causing the computer to decode predictive images whereby encoded data is decoded and reconstructed predictive images are outputted.

3. A computer program embodied on a computer readable medium for use with a computer for image decoding, said computer program comprising:

computer readable program code means for causing the computer to input a reference relationship table detailing the coding dependency of camera position, reference image encoded data positions, and predictive image encoded data position, together with, in the case of predictive image encoded data, encoded data characterized in that it comprises modified information vis-à-vis the reference image, and residual information vis-à-vis an image which has been modified using this modified information, into an monitoring device;

computer readable program code means for causing the computer to monitor image requests whereby requests for images which are to be reproduced are monitored successively;

computer readable program code means for causing the computer to select, using the reference relationship table, reference image encoded data when the image request is the reference image, and select either one of or both of reference image encoded data and predictive image encoded data according to the image decoding status when the image request is predictive image;

computer readable program code means for causing the computer to decode reconstructed reference images whereby reconstructed reference images are decoded from reference image encoded data;

computer readable program code means for causing the computer to decode modified reference images whereby modified reference images are decoded from modified information on reconstructed reference images and predictive image encoded data; and computer readable program code means for causing the computer to decode reconstructed predictive images whereby reconstructed predictive images are decoded from residual information on modified images and predictive image encoded data, output being executed selectively from a device of the computer which performs the decoding of reconstructed reference images on the one hand, and a device of the computer which performs the decoding of modified reference images and a device of the computer which performs the decoding of reconstructed predictive image on the other.

4. A computer program embodied on a computer readable medium for use with a computer for image decoding, said computer program comprising:

computer readable program code means for causing the computer to select, using a reference relationship table, reference image encoded data when an image request is the reference image, and select either one or both of reference image encoded data and predictive image encoded data when the image request is a predictive image, the selecting being applied with requests for images which are to be reproduced, the reference relationship table detailing the coding dependency of camera position, reference image encoded data position and predictive image encoded data position, and encoded data whereby the images have been encoded;

computer readable program code means for causing the computer to decode reference images whereby reference images are decoded from the reference image encoded data;

computer readable program code means for causing the computer to store reconstructed reference image groups whereby a plurality of reconstructed reference images is stored;

computer readable program code means for causing the computer to decode predictive images whereby predictive images are decoded from the predictive image encoded data;

computer readable program code means for causing the computer to store reconstructed predictive image groups whereby a plurality of reconstructed predictive images is stored; and computer readable program code means for causing the computer to check image storage whereby the camera position of images which are to be stored is calculated in accordance with requests for images which are to be reproduced, and the number of images which are stored in a device of the computer which performs the storing of reconstructed reference images groups and a device of the computer which performs the storing of reconstructed predictive image groups is maintained at a constant level or below, reproduced images being output from the images which are being stored, having completed the decoding process.

5. A computer program embodied on a computer readable medium for use with a computer for image decoding, said computer program comprising:

computer readable program code means for causing the computer to input a reference relationship table detailing the coding dependency of camera position, reference image encoded data position and predictive image encoded data position into a monitoring device, and whereby requests for images which are to be reproduced are monitored successively and images requests output;

computer readable program code means for causing the computer to select encoded data using the reference relationship table, whereby encoded data for fresh decoding is selected from the current image request, previous image request, and information on images which have already been decoded and stored;

computer readable program code means for causing the computer to select predictive encoded data using the reference relationship table, whereby encoded data on images close to the current image request in terms of camera position is selected;

computer readable program code means for causing the computer to decode reference images whereby reference image encoded data is decoded into reference images;

computer readable program code means for causing the computer to decode predictive images whereby predictive image encoded data is decoded into predictive images;

computer readable program code means for causing the computer to store reconstructed reference image groups whereby a plurality of reconstructed reference images is stored; and computer readable program code means for causing the computer to store reconstructed predictive image groups whereby a plurality of reconstructed predictive images is stored, image requests being monitored and reproduced which encoded data for images which are close to the current image request is selected and decoded.

6. A computer program embodied on a computer readable medium for use with a computer for image encoding, said computer program comprising:

computer readable program code means for causing the computer to input a plurality of images which are to be encoded and the relevant camera position data into a reference/predictive grouping device;

computer readable program code means for causing the computer to group the plurality of images which are to be encoded into reference images and predictive images which are predictively encoded from the reference images, wherein a plurality of predictive images reference the same reference image;

computer readable program code means for causing the computer to estimate modification constraint formulae whereby modification constraint formulae between reference images and predictive images are estimated based on the reference/predictive relationship in each group;

computer readable program code means for causing the computer to encode the reference images based on the reference/predictive relationship in each group;

computer readable program code means for causing the computer to encode the predictive images while constraining modifications in accordance with modification constraint formulae based on the reference/predictive relationship in each group;

computer readable program code means for causing the computer to compile a reference relationship table detailing the coding dependency of each image, encoded data positions and camera positions for reference/predictive groups based on the reference/predictive relationship in each group; and computer readable program code means for causing the computer to output the reference relationship table and the encoded data.

7. A computer program embodied on a computer readable medium for use with a computer for image decoding, said computer program comprising:

computer readable program code means for causing the computer to input requests for images which are to be reproduced, encoded data whereby the images have been encoded, and a reference relationship table detailing a coding dependency of each image, encoded data positions and camera positions based on reference/predictive relationships into a selecting device;

computer readable program code means for causing the computer to select encoded data of the requested image and encoded data of the image being referenced by the encoded data from the reference relationship table;

computer readable program code means for causing the computer to decode reference images whereby reference image encoded data is decoded and reconstructed reference images are output; and computer readable program code means for causing the computer to decode predictive images while constraining modifications in accordance with modification constraint formulae, and outputting reconstructed predictive images.

8. A computer program embodied on a computer readable medium for use with a computer for image encoding, said computer program comprising:

computer readable program code means for causing the computer to input a plurality of images which are to be encoded, the relevant camera position data and light source position data into a reference/predictive grouping device;

computer readable program code means for causing the computer to group the plurality of images which are to be encoded into reference images and predictive images which are predictively encoded from the reference images, wherein a plurality of predictive images reference the same reference image;

computer readable program code means for causing the computer to encode the reference images based on the reference/predictive relationship in each group;

computer readable program code means for causing the computer to encode the predictive images, by referencing the reconstructed reference images, based on the reference/predictive relationship in each group;

computer readable program code means for causing the computer to compile a reference relationship table detailing the coding dependency, encoded data positions and camera positions based on the reference/predictive relationship in each group; and computer readable program code means for causing the computer to output the reference relationship table and the encoded data.

9. A computer program embodied on a computer readable medium for use with a computer for image decoding, said computer program comprising:

computer readable program code means for causing the computer to input requests for images which are to be reproduced, encoded data whereby the images have been encoded, and a reference relationship table detailing a coding dependency of each image, camera positions, light source positions and encoded data positions based on reference/predictive relationships into a selecting device;

computer readable program code means for causing the computer to select encoded data of the requested image and encoded data of the image being referenced by the encoded data from the reference relationship table;

computer readable program code means for causing the computer to decode reference images whereby encoded data is decoded and reconstructed reference images are output; and computer readable program code means for causing the computer to decode predictive images whereby encoded data is decoded and reconstructed predictive images are output.

10. An image encoding device comprising:

reference/predictive grouping device into which are input a plurality of images which are to be encoded and relevant camera position data, said reference/predictive grouping device operable to group the plurality of images which are to be encoded into reference images and predictive images which are predictively encoded from the reference images, wherein a plurality of the predictive images reference the same reference image;

reference image encoding device operable to encode the reference images based on the reference/predictive relationship in each group;

predictive image encoding device operable to reference reconstructed reference images to encode predictive images based on the reference/predictive relationship in each group; and reference relationship table compiling device operable to compile a reference relationship table detailing reference/predictive relationships of each image, encoded data positions, and camera positions based on the reference/predictive relationship in each group, and to output the reference relationship table and the encoded data.

11. An image decoding device comprising:

selecting device into which are input requests for images which are to be reproduced, encoded data whereby the images have been encoded, and a reference relationship table detailing a coding dependency of each image, encoded data positions, and camera positions based on reference/predictive relationships said selecting device operable to select, from the reference relationship table, encoded data of the requested image and encoded data of the image referenced by the encoded data;

reference image decoding device operable to decode reference images whereby encoded data is decoded and reconstructed reference images are output; and predictive image decoding device operable to decode predictive images whereby encoded data is decoded and reconstructed predictive images are output.

12. An image decoding device comprising:

image request monitoring device operable to monitor images requests and having inputted therein a reference relationship table detailing the coding dependency of camera position, reference image encoded data positions, and predictive image encoded data position, together with, in the case of predictive image encoded data, encoded data characterized in that it comprises modified information vis-à-vis the reference image, and residual information vis-à-vis an image which has been modified using this modified information;

device operable to monitor image requests whereby requests for images which are to be reproduced are monitored successively;

selecting device operable to select, using the reference relationship table, reference image encoded data when the image request is the reference image, and to select either one of or both of reference image encoded data and predictive image encoded data according to the image decoding status when the image request is the predictive image;

reconstructed reference image decoding device operable to decode reconstructed reference images whereby reconstructed reference images are decoded from reference image encoded data;

modified reference image decoding device operable to decode modified reference images whereby modified reference images are decoded from modified information on reconstructed reference images and predictive image encoded data; and reconstructed predictive image decoding device operable to decode reconstructed predictive images whereby reconstructed predictive images are decoded from residual information on modified images and predictive image encoded data, output being executed selectively from said reconstructed reference image decoding device on the one hand, and said modified reference image decoding device and said reconstructed predictive image decoding device on the other.

13. An image decoding device comprising:

selecting device operable to select, using a reference relationship table, reference image encoded data when an image request is the reference image, and to select either one or both of reference image encoded data and predictive image encoded data when the image request is a predictive image, said selecting device being applied with requests for images which are to be reproduced, the reference relationship table detailing the coding dependency of camera position, reference image encoded data position and predictive image encoded data position, and encoded data whereby the images have been encoded;

reference image decoding device operable to decode reference images whereby reference images are decoded from the reference image encoded data, reconstructed reference image group storing device operable to store reconstructed reference image groups whereby a plurality of reconstructed reference images is stored;

predictive image decoding device operable to decode predictive images whereby predictive images are decoded from the predictive image encoded data;

reconstructed predictive image group storing device operable to store reconstructed predictive image groups whereby a plurality of reconstructed predictive images is stored; and image storage checking device operable to check image storage whereby the camera position of images which are to be stored is calculated in accordance with requests for images which are to be reproduced, and the number of images which are stored in said reconstructed reference image group storing device and said reconstructed predictive image group storing device is maintained at a constant level or below, reproduced images being output from the images which are being stored, having completed the decoding process.

14. An image decoding device comprising:

image request monitoring device into which are input a reference relationship table detailing the coding dependency of camera position, reference image encoded data position and predictive image encoded data position, said image request monitoring device operable to monitor successive requests for images which are to be reproduced and images requests output;

encoded data selecting device operable to select encoded data using the reference relationship table, whereby encoded data for fresh decoding is selected from the current image request, previous image request, and information on images which have already been decoded and stored;

predictive encoded data selecting device operable to select predictive encoded data using the reference relationship table, whereby encoded data on images close to the current image request in terms of camera position is selected;

reference image decoding device operable to decode reference images whereby reference image encoded data is decoded into reference images;

predictive image decoding device operable to decode predictive images whereby predictive image encoded data is decoded into predictive images;

reconstructed reference image group storing device operable to store reconstructed reference image groups whereby a plurality of reconstructed reference images is stored; and reconstructed predictive image group storing device operable to store reconstructed predictive image groups whereby a plurality of reconstructed predictive images is stored, image requests being monitored and reproduced while encoded data for images which are close to the current image request is selected and decoded.

15. An image encoding device comprising:
reference/predictive grouping device into which are input a plurality of images which are to be encoded and the relevant camera position data, said reference/predictive grouping device operable to group the plurality of images which are to be encoded into reference images and predictive images which are predictively encoded from the reference images, and wherein a plurality of predictive images reference the same reference image;

modification constraint formulae estimation device operable to estimate modification constraint formulae whereby modification constraint formulae between reference images and predictive images are estimated based on the reference/predictive relationship in each group;

reference image encoding device operable to encode the reference images based on the reference/predictive relationship in each group;

constrained predictive image encoding device operable to encode predictive images while constraining modifications in accordance with modification constraint formulae based on the reference/predictive relationship in each group; and reference relationship table compiling device operable to compile a reference relationship table detailing reference/predictive relationships of each image, encoded data positions and camera positions for reference/predictive groups based on the reference/predictive relationship in each group, and to output the reference relationship table and the encoded data.

16. An image decoding device comprising:
selecting device into which are input requests for images which are to be reproduced, encoded data whereby the images have been encoded, and a reference relationship table detailing a coding dependency of each image, encoded data positions and camera positions based on reference/predictive relationships, said selecting device is operable to select encoded data of the requested image and encoded data of the image being referenced by the encoded data from the reference relationship table;

reference image decoding device operable to decode reference images whereby reference image encoded data is decoded and reconstructed reference images are output; and constrained predictive image decoding device operable to decode predictive images while constraining modifications in accordance with modification constraint formulae, and to output reconstructed predictive images.

17. An image encoding device comprising:
reference/predictive grouping device into which are input a plurality of images which are to be encoded, the relevant camera position data and light source position data, said reference/predictive grouping device operable to group the plurality of images which are to be encoded into reference images and predictive images which are predictively encoded from the reference images, and wherein a plurality of predictive images reference the same reference image;

reference image encoding device operable to encode the reference images based on the reference/predictive relationship in each group;

predictive image encoding device operable to reference reconstructed reference images to encode predictive images based on the reference/predictive relationship in each group; and reference relationship table compiling device operable to compile a reference relationship table detailing reference/predictive relationships encoded data positions and camera positions based on the reference/predictive relationship in each group, and to output the reference relationship table and the encoded data.

18. An image decoding device comprising:
selecting device into which are input requests for images which are to be reproduced, encoded data whereby the images have been encoded, and a reference relationship table detailing a coding dependency of each image, camera positions, light source positions and encoded data positions based on reference/predictive relationships, said selecting device operable to select encoded data of the requested image and encoded data of the image being referenced by the encoded data from the reference relationship table;

reference image decoding device operable to decode reference images whereby encoded data is decoded and reconstructed reference images are output; and predictive image decoding device operable to decode predictive images whereby encoded data is decoded and reconstructed predictive images are output.

19. An image encoding method comprising:
inputting a plurality of images which are to be encoded and relevant camera position data into a reference/predictive grouping device;

grouping the plurality of images which are to be encoded into reference images and predictive images which are predictively encoded from the reference images, wherein a plurality of the predictive images reference the same reference image;

encoding the reference images based on the reference/predictive relationship in each group;

encoding the predictive images, by referencing the reconstructed reference images, based on the reference/predictive relationship in each group;

compiling a reference relationship table detailing the coding dependency of each image, encoded data positions, and camera positions based on the reference/predictive relationship in each group; and outputting the reference relationship table and the encoded data.

20. An image encoding method comprising:
inputting a plurality of images which are to be encoded and the relevant camera position data into a reference/predictive grouping device;

grouping the plurality of images which are to be encoded into reference images and predictive images which are predictively encoded from the reference images, wherein a plurality of predictive images reference the same reference image;

estimating modification constraint formulae whereby modification constraint formulae between reference images and predictive images are estimated based on the reference/predictive relationship in each group;

encoding the reference images based on the reference/predictive relationship in each group;

encoding the predictive images while constraining modifications in accordance with modification constraint formulae based on the reference/predictive relationship in each group;

compiling a reference relationship table detailing the coding dependency of each image, encoded data positions and camera positions for reference/predictive groups based on the reference/predictive relationship in each group; and outputting the reference relationship table and the encoded data.

21. An image encoding method comprising:

inputting a plurality of images which are to be encoded, the relevant camera position data and light source position data into a reference/predictive grouping device;

grouping the plurality of images which are to be encoded into reference images and predictive images which are predictively encoded from the reference images, wherein a plurality of predictive images reference the same reference image;

encoding the reference images based on the reference/predictive relationship in each group;

encoding the predictive images, by referencing the reconstructed reference images, based on the reference/predictive relationship in each group;

compiling a reference relationship table detailing the coding dependency of each image, encoded data positions and camera positions based on the reference/predictive relationship in each group; and outputting the reference relationship table and the encoded data.

22. An image decoding method comprising:

inputting requests for images which are to be reproduced, encoded data whereby the images have been encoded, and a reference relationship table detailing a coding dependency of each image, encoded data positions, and camera positions based on reference/predictive relationships into a selecting device;

selecting, from the reference relationship table, encoded data of the requested image and encoded data of the image referenced by the encoded data;

decoding reference images whereby encoded data is decoded and reconstructed reference images are outputted; and decoding predictive images whereby encoded data is decoded and reconstructed predictive images are outputted.

23. An image decoding method comprising:

inputting a reference relationship table detailing the coding dependency of camera position, reference image encoded data positions, and predictive image encoded data position, together with, in the case of predictive image encoded data, encoded data characterized in that it comprises modified information vis-à-vis the reference image, and residual information vis-à-vis an image which has been modified using this modified information, into an monitoring device;

monitoring image requests whereby requests for images which are to be reproduced are monitored successively;

selecting, using the reference relationship table, reference image encoded data when the image request is the reference image, and selecting either one of or both of reference image encoded data and predictive image encoded data according to the image decoding status when the image request is predictive image;

decoding reconstructed reference images whereby reconstructed reference images are decoded from reference image encoded data;

decoding modified reference images whereby modified reference images are decoded from modified information on reconstructed reference images and predictive image encoded data; and decoding reconstructed predictive images whereby reconstructed predictive images are decoded from residual information on modified images and predictive image encoded data, output being executed selectively from a device performing said decoding of reconstructed reference images on the one hand, and a device performing said decoding of modified reference images and a device performing said decoding of reconstructed predictive image on the other.

24. An image decoding method comprising:

selecting, using a reference relationship table, reference image encoded data when an image request is the reference image, and selecting either one or both of reference image encoded data and predictive image encoded data when the image request is a predictive image, said selecting being applied with requests for images which are to be reproduced, the reference relationship table detailing the coding dependency of camera position, reference image encoded data position and predictive image encoded data position, and encoded data whereby the images have been encoded;

decoding reference images whereby reference images are decoded from the reference image encoded data;

storing reconstructed reference image groups whereby a plurality of reconstructed reference images is stored;

decoding predictive images whereby predictive images are decoded from the predictive image encoded data;

storing reconstructed predictive image groups whereby a plurality of reconstructed predictive images is stored; and checking image storage whereby the camera position of images which are to be stored is calculated in accordance with requests for images which are to be reproduced, and the number of images which are stored in a device performing said storing of reconstructed reference images groups and a device performing said storing of reconstructed predictive image groups is maintained at a constant level or below, reproduced images being output from the images which are being stored, having completed the decoding process.

25. An image decoding method comprising:

inputting a reference relationship table detailing the coding dependency of camera position, reference image encoded data position and predictive image encoded data position into a monitoring device, and whereby requests for images which are to be reproduced are monitored successively and images requests output;

selecting encoded data using the reference relationship table, whereby encoded data for fresh decoding is selected from the current image request, previous image request, and information on images which have already been decoded and stored;

selecting predictive encoded data using the reference relationship table, whereby encoded data on images close to the current image request in terms of camera position is selected;

decoding reference images whereby reference image encoded data is decoded into reference images;

decoding predictive images whereby predictive image encoded data is decoded into predictive images;

storing reconstructed reference image groups whereby a plurality of reconstructed reference images is stored; and storing reconstructed predictive image groups whereby a plurality of reconstructed predictive images is stored, image requests being monitored and reproduced which encoded data for images which are close to the current image request is selected and decoded.

26. An image decoding method comprising:

inputting requests for images which are to be reproduced, encoded data whereby the images have been encoded, and a reference relationship table detailing a coding dependency of each image, encoded data positions and camera positions based on reference/predictive relationships into a selecting device;

selecting encoded data of the requested image and encoded data of the image being referenced by the encoded data from the reference relationship table;

decoding reference images whereby reference image encoded data is decoded and reconstructed reference images are output; and decoding predictive images while constraining modifications in accordance with modification constraint formulae, and outputting reconstructed predictive images.

27. An image decoding method comprising:

inputting requests for images which are to be reproduced, encoded data whereby the images have been encoded, and a reference relationship table detailing a coding dependency of each image, camera positions, light source positions and encoded data positions based on reference/predictive relationships into a selecting device;

selecting encoded data of the requested image and encoded data of the image being referenced by the encoded data from the reference relationship table;

decoding reference images whereby encoded data is decoded and reconstructed reference images are output; and decoding predictive images whereby encoded data is decoded and reconstructed predictive images are output.

* * * * *